US012640364B2

(12) United States Patent
Easter et al.

(10) Patent No.: US 12,640,364 B2
(45) Date of Patent: May 26, 2026

(54) HIGH CAPACITY, LONG CYCLE LIFE BATTERY ANODE MATERIALS, COMPOSITIONS AND METHODS

(71) Applicant: X-MAT BATTERY IP HOLDINGS, LLC, Oviedo, FL (US)

(72) Inventors: William G. Easter, Chulota, FL (US); Arnold Hill, Orlando, FL (US); Walter Sherwood, Ballston Lake, NY (US); Kyle Marcus, Orlando, FL (US)

(73) Assignee: Dynamic Material Systems LLC, Oviedo, FL (US)

( * ) Notice: Subject to any disclaimer, the term of this patent is extended or adjusted under 35 U.S.C. 154(b) by 510 days.

(21) Appl. No.: 17/941,697

(22) Filed: Sep. 9, 2022

(65) Prior Publication Data

US 2023/0015795 A1     Jan. 19, 2023

Related U.S. Application Data

(63) Continuation-in-part of application No. 16/543,130, filed on Aug. 16, 2019, now abandoned.

(60) Provisional application No. 62/861,036, filed on Jun. 13, 2019.

(51) Int. Cl.
| | |
|---|---|
| *H01M 4/36* | (2006.01) |
| *C01B 33/021* | (2006.01) |
| *C08G 77/20* | (2006.01) |
| *H01M 4/38* | (2006.01) |
| *H01M 4/60* | (2006.01) |
| *H01M 4/62* | (2006.01) |
| *H01M 4/02* | (2006.01) |

(52) U.S. Cl.
CPC ........... *H01M 4/364* (2013.01); *C01B 33/021* (2013.01); *C08G 77/20* (2013.01); *H01M 4/386* (2013.01); *H01M 4/604* (2013.01); *H01M 4/625* (2013.01); *C01P 2006/40* (2013.01); *H01M 2004/027* (2013.01)

(58) Field of Classification Search
CPC ...... H01M 4/364; H01M 4/386; H01M 4/604; H01M 4/625; H01M 2004/027; C01B 33/021; C08G 77/20; C01P 2006/40
See application file for complete search history.

(56) References Cited

U.S. PATENT DOCUMENTS

| | | | |
|---|---|---|---|
| 9,853,292 | B2 | 12/2017 | Loveridge et al. |
| 2010/0021819 | A1 | 1/2010 | Zhamu et al. |
| 2014/0274658 | A1 | 9/2014 | Sherwood et al. |
| 2014/0323364 | A1* | 10/2014 | Sherwood ........... C04B 35/6269 |
| | | | 507/219 |
| 2015/0175750 | A1 | 6/2015 | Hopkins et al. |
| 2016/0056451 | A1 | 2/2016 | Singh et al. |

| | | | |
|---|---|---|---|
| 2017/0183514 | A1* | 6/2017 | Benac ................... C08K 3/013 |
| 2017/0253720 | A1 | 9/2017 | Hopkins et al. |
| 2017/0320744 | A1 | 11/2017 | Haon et al. |
| 2020/0395602 | A1 | 12/2020 | Easter |

FOREIGN PATENT DOCUMENTS

| | | | |
|---|---|---|---|
| CN | 102299338 A | 12/2011 | |
| CN | 107910554 A * | 4/2018 | ........ H01M 10/0525 |
| EP | 2461397 A1 | 6/2012 | |
| KR | 20180038764 A | 4/2018 | |
| WO | 2014138721 A1 | 9/2014 | |
| WO | 2018049231 A1 | 3/2018 | |
| WO | 2022005064 A1 | 1/2022 | |

OTHER PUBLICATIONS

X-Mat Battery IP Holdings, LLC, European Patent Application No. 23169028.0, filed on Apr. 20, 2023, Extended European Search Report mailed on Feb. 9, 2024, 9 pages.
Berckmans, Gert, et al. Cost Projection of State of the Art Lithium-Ion Batteries for Electronic Vehicles up to 2030, Energies, publishes Sep. 1, 2017, 20 pages.
Dunn, J.B., et al., Material and Energy Flows in the Materials Production, Assembly, and End-of-Life Stages of the Automotive Lithium-Ion Battery Life cycle, Argonne National, Energy System Division, Jun. 2012, 73 pages.
Easter, W. et al., PCT Patent Application No. PCT/US2019/046906 filed Aug. 16, 2019, Notification of the Transmittal of the International Search Report and the Written Opinion of the International Searching Authority, or the Declaration mailed Oct. 29, 2019, 15 pages.
Golubkov, Andrey W., et al., Thermal-runaway experiments on consumer Li-ion batteries with metal-oxide and olivine-type cathodes, The Royal Society of Chemistry, published Nov. 27, 2013, 10 pages.

* cited by examiner

*Primary Examiner* — Haidung D Nguyen
(74) *Attorney, Agent, or Firm* — Brian S. Steinberger; Hilary F. Steinberger; Steinberger IP Law

(57) ABSTRACT

Polymer derived ceramic (PDC) materials, compositions and methods of making high capacity, long cycle, long life battery anodes to improve the performance of batteries of all types, including but not limited to coin cell batteries, electric vehicle (EV) batteries, hybrid electric vehicle (HEV) batteries, plug-in hybrid electric vehicle (PHEV) batteries, battery electric vehicle (BEV) batteries, lithium cobalt (LCO) batteries, lithium iron (LFP) batteries; and lithium-ion (Li) batteries, and lead acid batteries. Silicon is incorporated in the PDC material at a molecular level when reacting a polymer derived ceramic precursor and a silicon hydride constituent or a silicon alkoxide constituent to form a PDC composition useful as a powdered battery anode material. A predetermined amount of divinylbenzene is added as a crosslinker and a modifier to increase free carbon content. The resulting battery anode materials increase the specific capacity of a battery measured in milliampere-hours per gram (mAh/g) and increase the life cycle of a battery while minimizing distortion and stress of the anode structure.

9 Claims, 23 Drawing Sheets

FIG. 2a

Overview of the three cells species used in the experiments. All ratios in this table are given as mol ratios. The electrolyte solvents are dimethyl carbonate (DMC), ethyl methyl carbonate (EMC), ethylene carbonate (EC) and propylene carbonate (PC)

| | | LCO/NMC | NMC | LFP |
|---|---|---|---|---|
| Cell mass | g | 44.3 | 43.0 | 38.8 |
| Capacity | A h | 2.6 | 1.5 | 1.1 |
| Minimum voltage | V | 3.0 | 3.0 | 2.5 |
| Maximum voltage | V | 4.2 | 4.1 | 3.5 |
| Electrolyte solvents | | $DMC:EMC:EC\,(6:2:1)$ | $DMC:EMC:EC:PC$ $(7:1:1:1)$ | $DMC:EMC:EC:PC$ $(4:2:3:1)$ |
| Cathode material | | $LiCoO_2:Li$ $(Ni_{0.50}Mn_{0.25}Co_{0.25})O_2\,(2:1)$ | $Li(Ni_{0.45}Mn_{0.45}Co_{0.10})O_2$ | $LiFePO_4$ |
| Anode material | | Graphite | Graphite | Graphite |

FIG. 2b

Mass (m), area (A), thickness (d) and volume (V) of the main components of the three cell species. The geometrical volume of a standard 18650 cell is 16.5 cm$^3$

| | LCO/NMC | | | | NMC | | | | LFP | | | |
|---|---|---|---|---|---|---|---|---|---|---|---|---|
| | m (g) | A (cm$^2$) | d (μm) | V (cm$^3$) | m (g) | A (cm$^2$) | d (μm) | V (cm$^3$) | m (g) | A (cm$^2$) | d (μm) | V (cm$^3$) |
| Separator | 1.2 | 942 | 19 | 1.8 | 1.4 | 944 | 23 | 2.2 | 1.2 | 940 | 20 | 1.9 |
| Cathode Al foil | 1.7 | 403 | 16 | 0.6 | 3.1 | 389 | 30 | 1.1 | 2.1 | 396 | 19 | 0.7 |
| Cathode active material | 18.3 | 715 | 91 | 6.5 | 11.3 | 654 | 67 | 4.4 | 9.7 | 793 | 70 | 5.5 |
| Anode Cu foil | 2.9 | 402 | 8 | 0.3 | 7.5 | 418 | 20 | 0.8 | 3.9 | 396 | 17 | 0.7 |
| Anode active material | 8.1 | 739 | 81 | 6.0 | 6.2 | 695 | 60 | 4.2 | 5.2 | 793 | 50 | 4.0 |
| Electrolyte | 4.6 | | | | 4.4 | | | | 6.4 | | | |
| Housing | 7.5 | | | | 9.2 | | | | 10.5 | | | |
| Sum | 44.3 | | | 15.2 | 43.1 | | | 12.7 | 39.0 | | | 12.8 |

FIG. 3

|  | Battery I | Battery II |
|---|---|---|
| Positive electrode | NMC (6:2:2) | NMC (6:2:2) |
| Negative electrode | Graphite | Silicon Alloy [50] |
| Pack energy density | 155 Wh/kg | 205 Wh/kg |

COST BREAKDOWN OF BATTERY I

Cost of goods sold: 432$/kWh - Low production quantities
300$/kWh - High production quantities

COST BREAKDOWN OF BATTERY II

Cost of goods sold: 293$/kWh - Low production quantities

FIG. 6

| Component | Percent Mass | | |
| --- | --- | --- | --- |
| | HEV (%) | PHEV (%) | EV (%) |
| $LiMn_2O_4$ | 27 | 28 | 33 |
| Graphite/carbon | 12 | 12 | 15 |
| Binder | 2.1 | 2.1 | 2.5 |
| Copper | 13 | 15 | 11 |
| Wrought aluminum | 24 | 23 | 19 |
| $LiPF_6$ | 1.5 | 1.7 | 1.8 |
| EC | 4.4 | 4.9 | 5.3 |
| DMC | 4.4 | 4.9 | 5.3 |
| PP | 2.0 | 2.2 | 1.7 |
| PE | 0.26 | 0.40 | 0.29 |
| PET | 2.2 | 1.7 | 1.2 |
| Steel | 2.8 | 1.9 | 1.4 |
| Thermal insulation | 0.43 | 0.33 | 0.34 |
| Glycol | 2.3 | 1.3 | 1.0 |
| Electronic parts | 1.5 | 0.9 | 1.1 |
| Total battery mass (lb) | 41 | 196 | 463 |

FIG. 9b

| Discharge Capacity | | |
|---|---|---|
| | 25 Cycles | 50 Cycles |
| Natural Graphite+ | 449.0 mAh/g | 445.6 mAh/g |

| Discharge Capacity | | | | |
|---|---|---|---|---|
| | 50 Cycles | 100 Cycles | 150 Cycles | 200 Cycles |
| Natural Graphite+ | 673.7 mAh/g | 674.3 mAh/g | 668.1 mAh/g | 662.9 mAh/g |
| Natural Graphite | 217.4 mAh/g | 241.3 mAh/g | 162.5 mAh/g | 135.3 mAh/g |

FIG. 16b

| Discharge Capacity | | | | |
|---|---|---|---|---|
| | 25 Cycles | 50 Cycles | 75 Cycles | 100 Cycles |
| Natural Graphite+ | 770.6 mAh/g | 751 mAh/g | 751.6 mAh/g | |
| Natural Graphite | 350.7 mAh/g | 364.6 mAh/g | | |

FIG. 17b

| Discharge Capacity | | | |
|---|---|---|---|
| | 25 Cycles | 50 Cycles | 75 Cycles |
| Natural Graphite+ | 595 mAh/g | 570.4 mAh/g | 552.3 mAh/g |
| Natural Graphite | 350.7 mAh/g | 364.6 mAh/g | |

HIGH CAPACITY, LONG CYCLE LIFE BATTERY ANODE MATERIALS, COMPOSITIONS AND METHODS

CROSS REFERENCE TO RELATED APPLICATION

This application is a Continuation-In-Part of U.S. patent application Ser. No. 16/543,130 filed Aug. 16, 2019, which claims the benefit of priority to U.S. Provisional Application Ser. No. 62/861,036 filed Jun. 13, 2019. The entire disclosure of each of the applications listed in this paragraph are incorporated herein by specific reference thereto.

FIELD OF INVENTION

This invention relates to batteries, and in particular to materials, compositions and methods of making high capacity, long cycle, long life anodes for batteries.

BACKGROUND AND PRIOR ART

The typical methodology for incorporating high-capacity silicon into the carbon/graphite of lithium ion battery anodes was to form some sort of microscale mixture of silicon or silica powder with various forms of conductive carbon such as graphite, carbon nanotubes, graphene, or carbon black. While in many cases these mixtures result in improved specific capacity compared to conventional graphite, they universally suffer from capacity degradation after relatively few cycles (~50-75 charge/discharge cycles) due to damage to the silicon from lithiation/delithiation.

Polymer derived ceramics (PDCs) were considered to be a possible means of avoiding capacity degradation of batteries. However, while there has been significant work evaluating PDCs as replacements for graphite in lithium-ion battery anodes; the relatively low electrical conductivity of conventional commercially available PDC resins has kept these materials from demonstrating their full potential.

Thus, the need exists for solutions to the above problems with the prior art.

SUMMARY OF THE INVENTION

A primary objective of the present invention is to provide materials, compositions and methods of making high capacity, long cycle, long life battery anode materials for batteries.

The present invention involves the creation of silicon containing battery anode materials by formulating anode compositions that contain both high silicon content for high capacity and high carbon content for electrical conductivity, and modified carbon structure for longer cycle life by utilizing novel polymer-derived ceramic (PDC) precursor formulations.

The basis of the invention is the ability to design the ceramic material to incorporate the silicon at the molecular level instead of in micron size particles mixed with carbon as is currently done in the art. The precursors are formulated to control the silicon, carbon, and oxygen content and the structure of the carbon phase in the resulting ceramic to significantly increase the specific capacity while minimizing the distortion of the anode structure due to lithiation/delithiation.

This optimization results in both three times (3×) or more higher capacity than current graphite anode materials and longer charge/discharge cycle life compared to current mixtures of silicon particles and carbon sources such as graphite, graphene, nanotubes, and the like.

A major advantage of this invention is that large increases in specific capacity over current anode materials are achievable at a projected cost comparable to high purity graphite used for anodes today. This is in a large part due to the fact that the materials disclosed in this invention are made from low cost starting materials and the resulting ceramic is readily formed into the fine powders currently used in commercial battery systems.

A polymer derived ceramic (PDC) composition embodiment incorporating silicon at a molecular level to produce a battery anode material that increases the specific capacity of a battery and increases the life cycle of a battery wherein the starting material for the PDC composition can include a silicon hydride constituent or a silicon alkoxide constituent.

The silicon hydride constituent can be selected from at least one of a silicon hydride monomer, a silicon hydride polymer and mixtures thereof.

The silicon hydride constituent can further be reacted with vinyl containing organic modifiers; crosslinking additives; and a catalyst.

Approximately 100 weight percent of the composition can include approximately 35% to approximately 75% by weight of silicon hydride monomer, silicon hydride polymer and mixtures thereof, approximately 25% to approximately 65% by weight of vinyl containing organic modifiers, approximately 5% to approximately 50% by weight of crosslinking additives, and approximately 0.1% to approximately 4% by weight of a catalyst.

Approximately 100 weight percent of the composition can include approximately 40% to approximately 70% by weight of silicon hydride monomer, silicon hydride polymer and mixtures thereof, approximately 33% to approximately 65% by weight of vinyl containing organic modifiers, approximately 10% to approximately 50% by weight of crosslinking additives and approximately 1% to approximately 3% by weight of a catalyst.

The silicon alkoxide constituent can be selected from at least one of a silicon alkoxide monomer, silicon alkoxide polymer and mixtures thereof.

The silicon alkoxide constituent can further reacted with alkyl alkoxysilanes, a crosslinking additive and a catalyst.

Approximately 100 weight percent of the composition of the polymer can include approximately 40% to approximately 100% by weight of phenyl alkoxysilanes, approximately 25% to approximately 65% by weight of methyl alkoxysilanes, approximately 5% to approximately 50% by weight of vinyl alkoxysilanes, approximately 0% to approximately 50% by weight of crosslinking additives, and approximately 0.5% to approximately 4% by weight of a catalyst.

Approximately 100 weight percent of the composition of the polymer was the result of hydrolysis/polymerization of a mixture can include approximately 50% to approximately 80% by weight of phenyl alkoxysilanes, approximately 10% to approximately 35% by weight of methyl alkoxysilanes, approximately 20% to approximately 50% by weight of vinyl alkoxysilanes, approximately 10% to approximately 40% by weight of crosslinking additives and approximately 2% to approximately 3% by weight of a catalyst.

Approximately 100 weight percent of the composition of the polymer with the filler material can include approximately 10% to approximately 90% by weight of silicon hydride monomer, silicon hydride polymer and mixtures thereof, approximately 10% to approximately 90% by weight of a graphite carbon material selected from synthetic graphite, natural graphite, purified graphite, bituminous coal, anthracite coal, sub-bituminous coal, lignite, peat and mixtures thereof, approximately 0% to approximately 20% by weight of carbon nanotubes, graphite nanofibers, milled graphite fibers, carbon black or graphene materials, and approximately 0% to approximately 20% by weight of a filler selected from silicon micropowder or silicon nanopowder, titanium or titanium-based nanopowder, zirconium or zirconium based nanopowder, tin or tin-based nanopowder; copper or copper-based nanopowder, aluminum or aluminum based nanopowder, and lithium or lithium based compound.

Approximately 100 weight percent of the composition of the polymer with the filler material can include approximately 10% to approximately 60% by weight of silicon hydride monomer, silicon hydride polymer and mixtures thereof, approximately 40% to approximately 90% by weight of a graphite carbon material selected from synthetic graphite, natural graphite, purified graphite, bituminous coal, anthracite coal, sub-bituminous coal, lignite, peat and mixtures thereof, approximately 0% to approximately 10% by weight of carbon nanotubes, graphite nanofibers, milled graphite fibers, carbon black or graphene materials, and approximately 0% to approximately 15% by weight of a filler selected from silicon micropowder or silicon nanopowder, titanium or titanium-based nanopowder, zirconium or zirconium based nanopowder, tin or tin-based nanopowder; copper or copper-based nanopowder, aluminum or aluminum based nanopowder, and lithium or lithium based compound.

Approximately 100 weight percent of the composition of the polymer with the filler material can include approximately 10% to approximately 90% by weight of a polymer derived from the silicon alkoxide monomer, silicon alkoxide polymer and mixtures thereof, approximately 10% to approximately 90% by weight of a graphite carbon material selected from synthetic graphite, natural graphite, purified graphite, bituminous coal, anthracite coal, sub-bituminous coal, lignite, peat and mixtures thereof, approximately 0% to approximately 20% by weight of at least one of carbon nanotubes, graphite nanofibers, milled graphite fibers, carbon black or graphene materials, and approximately 0% to approximately 20% by weight of a filler selected from titanium or titanium-based nanopowder, zirconium or zirconium based nanopowder, tin or tin-based nanopowder; copper or copper-based nanopowder, aluminum or aluminum based nanopowder, and lithium or lithium based compound.

Approximately 100 weight percent of the composition of the polymer with the filler material can include approximately 10% to approximately 60% by weight of a polymer derived from the silicon alkoxide monomer, silicon alkoxide polymer and mixtures thereof, approximately 40% to approximately 90% by weight of a graphite carbon material selected from synthetic graphite, natural graphite, purified graphite, bituminous coal, anthracite coal, sub-bituminous coal, lignite, peat and mixtures thereof, approximately 0% to approximately 10% by weight of at least one of carbon nanotubes, graphite nanofibers, milled graphite fibers, carbon black or graphene materials, and approximately 0% to approximately 15% by weight of a filler selected from titanium or titanium-based nanopowder, zirconium or zirconium based nanopowder, tin or tin-based nanopowder; copper or copper-based nanopowder, aluminum or aluminum based nanopowder, and lithium or lithium based compound.

An embodiment of a PDC (polymer derived ceramic) composition containing silicon at a molecular level useful for producing a battery anode material wherein 100 weight percent of the composition can include a polymer derived ceramic (PDC) component having a weight percent range of between approximately 1 weight percent to approximately 20 weight percent, the PDC component selected from one of a thermosetting silicon hydride containing PDC polymer and a thermoplastic silicon alkoxide containing PDC polymer, and a graphite carbon component having a weight percent range of between approximately 80 weight percent to approximately 99 weight percent, the graphite carbon component being selected from the group consisting of synthetic graphite, natural graphite, purified graphite, bituminous coal, anthracite coal, sub-bituminous coal, lignite, peat and mixtures thereof.

The PDC component can be approximately 1 weight percent, and the graphite carbon component can be approximately 99 weight percent.

The PDC component can be up to approximately 20 weight percent, and the graphite carbon component can be approximately 80 weight percent.

The graphite carbon component can be between 80 to 85 weight percent.

The graphite carbon component can be between 86 to 90 weight percent.

The graphite carbon component can be between 90 to 95 weight percent.

The graphite carbon component can be between 96 to 99 weight percent.

The graphite carbon component can be coal.

The PDC composition can further include carbon nano materials having a weight percent range of up to approximately 10 weight percent, the carbon nano materials, selected from the group consisting of carbon nanotubes, graphite nanotubes, milled graphite fibers, carbon black, graphene, and mixtures thereof.

The PDC composition can further include additional fillers having a weight percent range of up to approximately 10 weight percent, the additional fillers, selected from powders containing at least one of silicon, titanium, zirconium, tin, copper, aluminum, lithium, and mixtures thereof.

Another embodiment of a PDC (polymer derived ceramic) composition containing silicon at a molecular level useful for producing a battery anode material wherein 100 weight percent of the composition can include a polymer derived ceramic (PDC) component having a weight percent range of between approximately 70 weight percent to approximately 99 weight percent, the PDC component selected from one of a thermosetting silicon hydride containing PDC polymer and a thermoplastic silicon alkoxide containing PDC polymer, and a graphite carbon component having a weight percent range of between approximately 1 weight percent to approximately 30 weight percent, the graphite carbon powder component being selected from the group consisting of synthetic graphite, natural graphite, purified graphite, bituminous coal, anthracite coal, sub-bituminous coal, lignite, peat and mixtures thereof.

The PDC component can be approximately 99 weight percent, and the graphite carbon powder component is approximately 1 weight percent.

The PDC component can be approximately 70 weight percent, and the graphite carbon powder component can be up to approximately 30 weight percent.

The PDC component can be approximately 71 to 75 weight percent

The PDC component can be approximately 76 to 80 weight percent.

The PDC component can be approximately 81 to 85 weight percent.

The PDC component can be approximately 86 to 90 weight percent.

The PDC component can be approximately 91 to 95 weight percent.

The PDC component can be approximately 96 to 99 weight percent.

The graphite carbon component can be coal.

The PDC composition can further include carbon nano materials having a weight percent range of up to approximately 10 weight percent, the carbon nano materials, selected from at least one of: carbon nanotubes, graphite nanotubes, milled graphite fibers, carbon black and graphene.

The PDC composition can further include additional fillers having a weight percent range of up to approximately 10 weight percent, the additional fillers, selected from powders containing at least one of silicon, titanium, zirconium, tin, copper, aluminum, lithium, and mixtures thereof Another embodiment of a PDC (polymer derived ceramic) composition containing silicon at a molecular level useful for producing a battery anode material wherein 100 weight percent of the composition can consist of a polymer derived ceramic (PDC) component having a weight percent range of between approximately 1 weight percent to approximately 20 weight percent, the PDC component selected from one of a thermosetting silicon hydride containing PDC polymer and a thermoplastic silicon alkoxide containing PDC polymer, and a graphite carbon component having a weight percent range of between approximately 80 weight percent to approximately 99 weight percent, the graphite carbon component being selected from the group consisting of synthetic graphite, natural graphite, purified graphite, bituminous coal, anthracite coal, sub-bituminous coal, lignite, peat and mixtures thereof, wherein the PDC composition solely consists of the PDC component and the graphite carbon component.

The graphite carbon component can be coal.

Another embodiment of a PDC (polymer derived ceramic) composition containing silicon at a molecular level useful for producing a battery anode material wherein 100 weight percent of the composition, can consist of a polymer derived ceramic (PDC) component having a weight percent range of between approximately 70 weight percent to approximately 99 weight percent, the PDC component selected from one of a thermosetting silicon hydride containing PDC polymer and a thermoplastic silicon alkoxide containing PDC polymer, and a graphite carbon component having a weight percent range of between approximately 1 weight percent to approximately 30 weight percent, the graphite carbon powder component being selected from the group consisting of synthetic graphite, natural graphite, purified graphite, bituminous coal, anthracite coal, sub-bituminous coal, lignite, peat and mixtures thereof, wherein the PDC composition solely consists of the PDC component and the graphite carbon powder component.

The graphite carbon component can be coal.

Another embodiment of a polymer derived ceramic (PDC) composition incorporating silicon at a molecular level to produce a battery anode powder material that increases the specific capacity of a battery and increases the life cycle of a battery, wherein the starting material for the PDC composition can include:

a silicon hydride constituent, and
wherein the silicon hydride constituent is selected from at least one of a silicon hydride monomer, a silicon hydride polymer and mixtures thereof, wherein the silicon hydride constituent is further reacted with vinyl containing organic crosslinking additives that include divinylbenzene for higher carbon content to increase conductivity; and a catalyst, wherein the composition produces the battery anode powder material which increases the specific capacity of a battery and increases the life cycle of a battery.

The vinyl-containing organic crosslinking additive can be divinylbenzene from approximately 4% to approximately 50% by weight of the total composition.

Another embodiment of a polymer derived ceramic (PDC) composition incorporating silicon at a molecular level to produce a battery anode material that increases the specific capacity of a battery and increases the life cycle of a battery, wherein the starting material for the PDC composition can include:

a silicon hydride constituent or a silicon,
wherein the silicon hydride constituent is selected from at least one of a silicon hydride monomer, a silicon hydride polymer and mixtures thereof,
wherein the silicon hydride constituent is further reacted with vinyl containing organic crosslinking additives that include divinylbenzene for higher carbon content to increase conductivity; and a catalyst;
wherein approximately 100 weight percent of the composition comprises:
approximately 35% to approximately 75% by weight of the silicon hydride monomer, silicon hydride polymer and mixtures thereof;
approximately 5% to approximately 50% by weight of the vinyl-containing organic crosslinking additives; and
approximately 0.1% to approximately 4% by weight of a catalyst.

The vinyl-containing organic crosslinking additive can be divinylbenzene, wherein approximately 100 weight percent of the composition includes approximately 40% to approximately 70% by weight of the silicon hydride monomer, silicon hydride polymer and mixtures thereof;
approximately 10% to approximately 30% by weight of the vinyl-containing organic crosslinking additives; and
approximately 1% to approximately 3% by weight of the catalyst.

Another embodiment of a polymer derived ceramic composition with a filler material incorporating silicon at a molecular level to produce a battery anode powder material that increases the specific capacity of a battery and increases the life cycle of a battery, wherein approximately 100 weight percent of the composition of the polymer with the filler material can include:

approximately 10% to approximately 90% by weight of silicon hydride monomer, silicon hydride polymer and mixtures thereof;
approximately 10% to approximately 90% by weight of a graphite carbon material selected from synthetic graphite, natural graphite, purified graphite, bituminous coal, anthracite coal, sub-bituminous coal, lignite, peat and mixtures thereof;
up to approximately 20% by weight of carbon nanotubes, graphite nanofibers, milled graphite fibers, carbon black or graphene materials;
up to approximately 20% by weight of a filler selected from silicon micropowder or silicon nanopowder, titanium or titanium-based nanopowder, zirconium or zirconium based nanopowder, tin or tin-based nanopowder; copper or copper-based nanopowder, aluminum or aluminum based nanopowder, and lithium or lithium based compound; and approximately 4% to approximately 50% of crosslinking additives that include divinylbenzene for higher carbon content to increase conductivity, wherein the composition produces the battery anode powder material which increases the specific capacity of a battery and increases the life cycle of a battery.

The approximately 100 weight percent of the composition of the polymer with the filler material can include:

approximately 10% to approximately 60% by weight of the silicon hydride monomer, silicon hydride polymer and mixtures thereof;

approximately 40% to approximately 90% by weight of the graphite carbon material;

up to approximately 10% by weight of the carbon nanotubes, graphite nanofibers, milled graphite fibers, carbon black or graphene materials;

up to approximately 15% by weight of the filler; and approximately 10% to approximately 20% of the crosslinking additives that include divinylbenzene for higher carbon content to increase conductivity.

Another embodiment of a polymer derived ceramic (PDC) composition incorporating silicon at a molecular level to produce a battery anode powder material that increases the specific capacity of a battery and increases the life cycle of a battery, wherein the starting material for the PDC composition can include:

a silicon hydride constituent, and wherein the silicon hydride constituent is selected from at least one of a silicon hydride monomer, a silicon hydride polymer and mixtures thereof, wherein the silicon hydride constituent is further reacted with a vinyl-containing organic modifier with a dual function for crosslinking and increasing free carbon content; and a catalyst, wherein the vinyl-containing organic modifier is selected from the group consisting of divinylbenzene, polybutadiene, methyl styene, (also called vinyltoluene) and tertiarty-butylstyrene, wherein the composition produces the battery anode powder material which increases the specific capacity of a battery and increases the life cycle of a battery.

The vinyl-containing organic modifier can be divinylbenzene which is approximately 4% to approximately 50% by weight of the total composition that produces the battery anode powder material.

Another embodiment of a polymer derived ceramic (PDC) composition incorporating silicon at a molecular level to produce a battery anode material that increases the specific capacity of a battery and increases the life cycle of a battery, wherein the starting material for the PDC composition can include:

a silicon hydride constituent or a silicon, wherein the silicon hydride constituent is selected from at least one of a silicon hydride monomer, a silicon hydride polymer and mixtures thereof, wherein the silicon hydride constituent is further reacted with vinyl-containing organic modifier for crosslinking and increasing free carbon content to increase conductivity, wherein the vinyl-containing organic modifier is selected from the group consisting of divinylbenzene, polybutadiene, methyl styrene (also called vinyltoluene), and tertiary-butylstyrene and a catalyst;

wherein the composition produces the battery anode powder material which increases the specific capacity of a battery and increases the life cycle of a battery.

The vinyl-containing organic modifier can be divinylbenzene which is approximately 4% to approximately 50% by weight of the total composition that produces the battery anode powder material.

Approximately 100 weight percent of the composition can include:

approximately 35% to approximately 75% by weight of the silicon hydride monomer, silicon hydride polymer and mixtures thereof;

approximately 5% to approximately 50% by weight of the divinylbenzene with the dual function of crosslinking and increasing free carbon content; and approximately 0.1% to approximately 4% by weight of the catalyst.

Approximately 100 weight percent of the composition comprises:

approximately 40% to approximately 70% by weight of silicon hydride monomer, silicon hydride polymer and mixtures thereof.

approximately 20% to approximately 40% by weight of divinylbenzene with the dual function of crosslinking and increasing free carbon content; and approximately 1% to approximately 3% by weight of a catalyst.

Another embodiment of a polymer derived ceramic composition with a filler material incorporating silicon at a molecular level to produce a battery anode powder material that increases the specific capacity of a battery and increases the life cycle of a battery, wherein approximately 100 weight percent of the composition can include:

approximately 10% to approximately 90% by weight of silicon hydride monomer, silicon hydride polymer and mixtures thereof;

approximately 10% to approximately 90% by weight of a graphite carbon material selected from synthetic graphite, natural graphite, purified graphite, bituminous coal, anthracite coal, sub-bituminous coal, lignite, peat and mixtures thereof;

up to approximately 20% by weight of carbon nanotubes, graphite nanofibers, milled graphite fibers, carbon black or graphene materials;

up to approximately 20% by weight of a filler selected from silicon micropowder or silicon nanopowder, titanium or titanium-based nanopowder, zirconium or zirconium based nanopowder, tin or tin-based nanopowder; copper or copper-based nanopowder, aluminum or aluminum based nanopowder, and lithium or lithium-based compound; and approximately 4% to approximately 50% by weight of crosslinking additives that include divinylbenzene for higher carbon content to increase conductivity, wherein the composition produces the battery anode powder material which increases the specific capacity of a battery and increases the life cycle of a battery.

Approximately 100 weight percent of the composition of the polymer with the filler material can include:

approximately 10% to approximately 60% by weight of the silicon hydride monomer, silicon hydride polymer and mixtures thereof;

approximately 40% to approximately 90% by weight of the graphite carbon material;

up to approximately 10% by weight of the carbon nanotubes, graphite nanofibers, milled graphite fibers, carbon black or graphene materials;

up to approximately 15% by weight of the filler; and approximately 10% to approximately 20% by weight of the crosslinking additives that include divinylbenzene for higher carbon content to increase conductivity.

A battery anode composition and structure can include:

a polymer derived ceramic (PDC) constituent incorporating silicon at a molecular level;

further reacted with at least one of a predetermined amount of a vinyl-containing modifier with dual function of crosslinking and increasing free carbon content, wherein the vinyl-containing modifier with the dual function of crosslinking and increasing carbon content is selected from the group consisting of divinylbenzene, polybutadiene, methyl styrene (also called vinyltoluene), and tertiary-butylstyrene to boost the carbon content of the resulting anode structure; and a catalyst to form a powdered battery anode material that increases the specific capacity of a battery, increases the life cycle of a battery, minimizes distortion and stress of the resulting anode structure.

The polymer derived ceramic (PDC) constituent can be selected from a silicon hydride constituent and a silicon alkoxide constituent.

The catalyst can be selected from the group consisting of platinum-containing compounds, peroxide-containing compounds, or organometallic compounds.

The vinyl-containing modifier can be divinylbenzene.

A predetermined amount of the vinyl-containing modifier can be from approximately 4% to approximately 50% of the total weight of the battery anode composition.

A predetermined amount of the vinyl-containing modifier can be from approximately 5% to approximately 20% of the total weight of the battery anode composition.

A predetermined amount of the vinyl-containing modifier can be from approximately 20% to approximately 30% of the total weight of the battery anode composition.

Further objects and advantages of this invention will be apparent from the following detailed description of the presently preferred embodiments which are illustrated schematically in the accompanying drawings.

BRIEF DESCRIPTION OF THE FIGURES

The drawing figures depict one or more implementations in accord with the present concepts, by way of example only, not by way of limitations. In the figures, like reference numerals refer to the same or similar elements.

FIG. 2A is a table showing the main components of three cell species.

FIG. 2B is a table showing a Mass split (m %) of the main components of the three cell species.

FIG. 3 is a table of the overview of the cell chemistry used in cost calculations; Battery I is referred to as the NMC battery; battery II is the silicon based lithium-ion battery.

FIG. 6 is a table of material inventories for HEV, PHEV and EV batteries.

FIG. 9B is a table showing values of discharge capacities at various cycle milestones corresponding to the graph in FIG. 9a.

FIG. 13 is a flow chart of a process for making SiOC powder electrode material with filler.

FIG. 15B is a table of the values of discharge capacities at various cycle milestones corresponding to the graph in FIG. 15A.

FIG. 16B is a table of the values of discharge capacities at various cycle milestones that correspond to the graph from FIG. 16A.

FIG. 17B is a table of the values of discharge capacities at various cycle milestones corresponding to the graph from FIG. 17A.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Other technical advantages may become readily apparent to one of ordinary skill in the art after review of the following figures and description.

The following terms and acronyms used in the Detailed Description are defined below.

Figure 13:
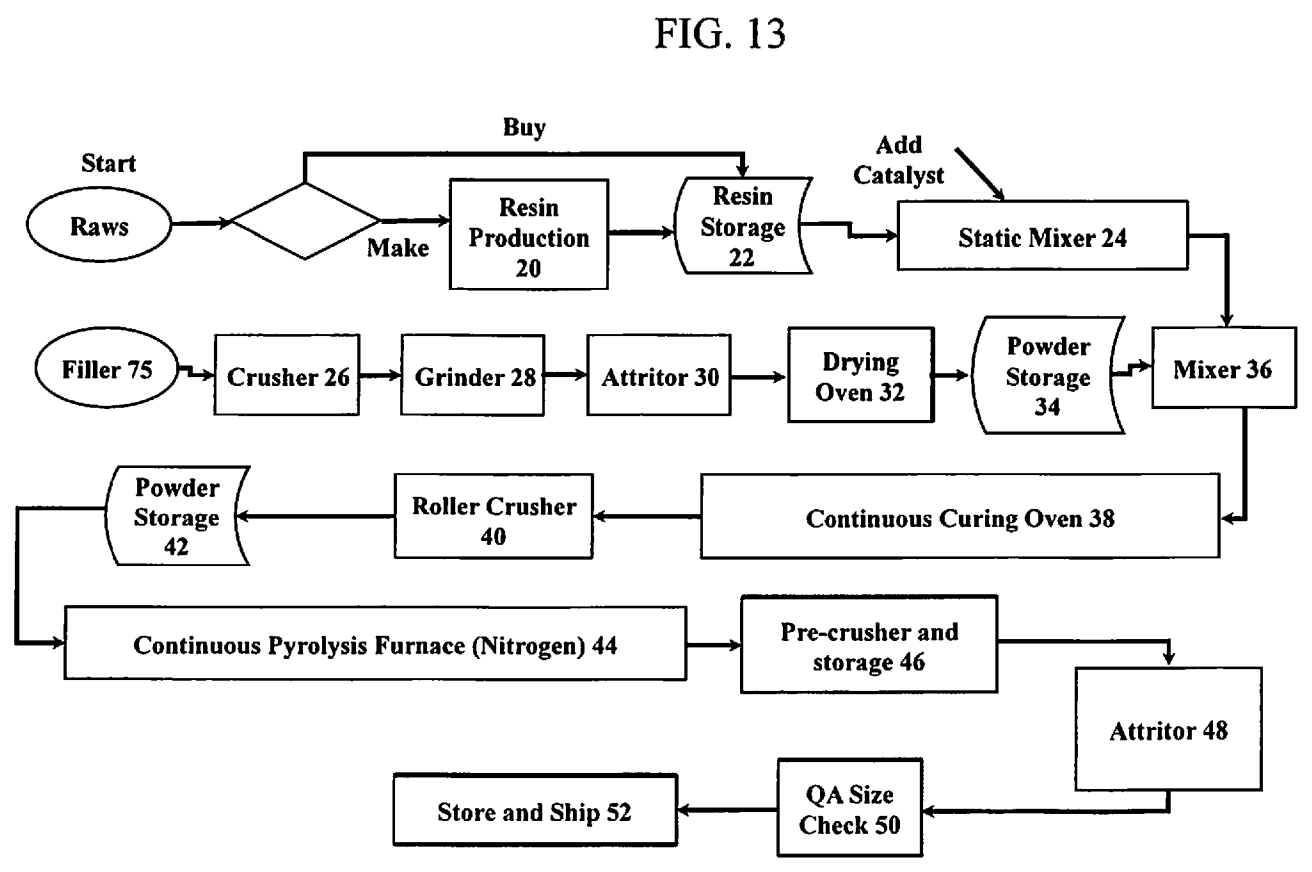
Figure 14:
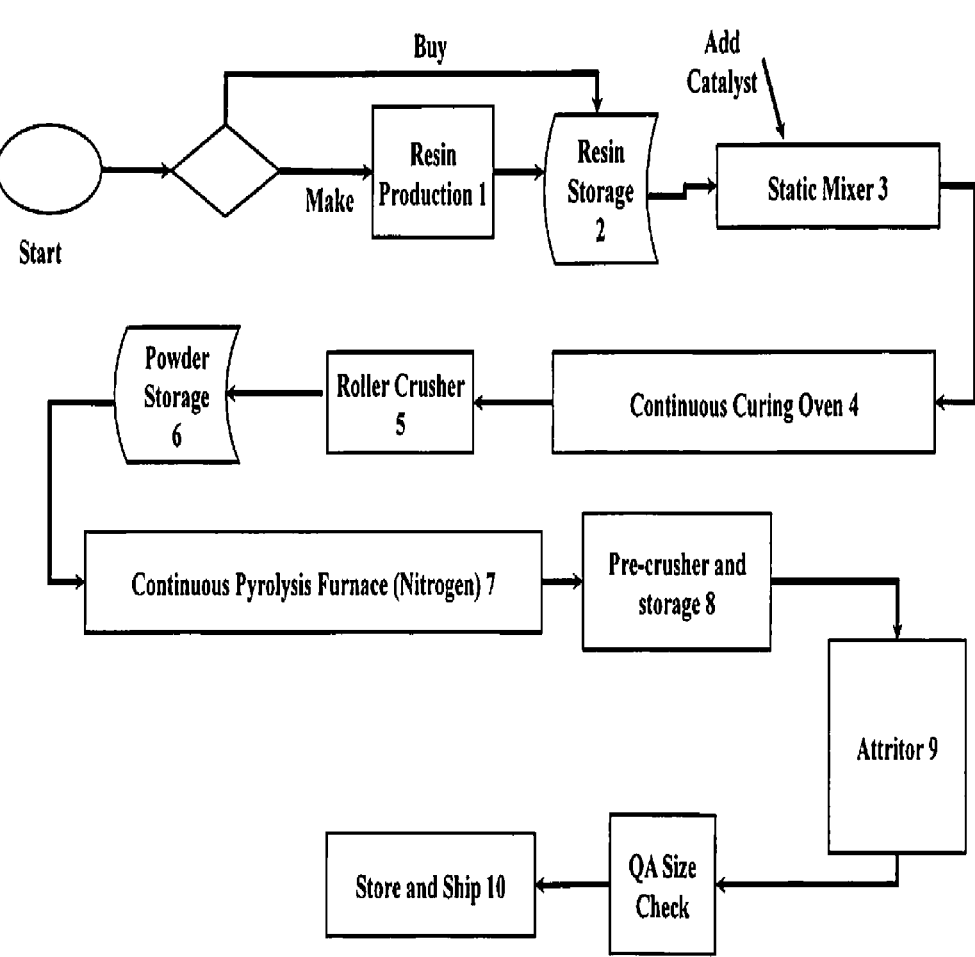
FIG. 14 is a flow chart of a process for making SiOC powder electrode material without a filler.

"A" is used in FIG. 13 and FIG. 14 to represent raw materials used in the synthesis of polymeric resins for the present invention.

"B" is used in FIG. 13 and FIG. 14 to represent starting materials purchased for use in the preparation of polymeric resins for the present invention.

BEV stands for battery powered electric vehicle

DMC stands for dimethyl carbonate

EV stands for electric vehicle

HEV stands for hybrid electric vehicle

LCO stands for lithium cobalt oxide

LFP stands for lithium iron phosphate

Li stands for lithium ions mAh (milliampere-hour) is the measure used to describe the energy charge that a battery will hold and how long a device will run before the battery needs recharging.

mAh/g stands for milliampere-hours per gram, the unit of measure for the specific capacity of a battery.

NMC stands for positive electrodes of lithium-ion batteries with $LiNi_{1-y-z}Mn_yCo_zO_2$ used in electric vehicles, power tools and energy storage systems. NMC positive electrodes offer lower energy density but longer lives and less likelihood of fire or explosion and is a leading contender for automotive applications. The letters NMC represent nickel, manganese and cobalt compounds.

PHEV stands for plug-in hybrid electric vehicle.

"Micromaterials"/"micro" are defined as having at least one dimension in the micrometer range, which falls within approximately 1 to approximately $1000 \times 10^{-6}$ meters.

"Nanomaterials"/"nano" are defined as having at least one dimension in the nanometer range, which falls within approximately 1 to approximately $1000 \times 10^{-9}$ meters and usually constitutes a range of approximately 1 to approximately $100 \times 10^{-9}$ meters.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise specifically noted, articles depicted in the drawings are not necessarily drawn to scale.

Batteries store electrical energy as a more stable chemical energy. The two main categories of batteries are primary and disposable, such as alkaline batteries; or secondary or rechargeable, such as lithium-ion batteries. Batteries come in a wide variety of configurations and consist of five main components: Anode, a negative electrode; Cathode, a positive electrode; Electrolyte, Separator, and Housing or Packaging. The present invention is focused on low cost, high performing anode materials that are easily produced.

The invention encompasses the use of two families of PDC ceramics as battery anode materials.

A first embodiment of the present invention is the preparation of Silicon Hydride-Containing PDC Ceramics. This group of ceramic materials results from the pyrolysis of precursors synthesized by hydrosilation of one or more silicon hydride containing monomers or polymers and one or more cyclic polyenes. Examples of silicon hydride containing monomers include, but are not limited to: phenylsilane, diphenylsilane, methylphenylsilane, and methylphenylvinylsilane. Examples of silicon hydride containing polymers include but are not limited to tetramethylcyclotetrasiloxane, and, methylhydrogen siloxane, and co-polymers of: dimethylsiloxane/methylhydrogen siloxane, phenylmethylsiloxane/methylhydrogen siloxane, and diphenylsiloxane/methylhydrogen siloxane.

Examples of useful cyclic polyenes include, but are not limited to: cyclobutadiene, cyclopentadiene, cyclohexadiene, norbornadiene, and bismaleimides such as N,N'-p-phenylenebismaleimide. Examples of useful polycyclic polyenes include cyclopentadiene oligomers such as dicyclopentadiene, tricyclopentadiene and tetracyclopentadiene, norbornadiene dimer, dimethanohexahydronaphthalene, bicycloheptadiene (i.e., norbornadiene) and its Diels-Alder oligomers with cyclopentadiene (e.g., dimethanohexahydronaphthalene), and substituted derivatives of any of these, e.g., methyl dicyclopentadienes.

In addition, other monomers or polymers containing unsaturated side groups or end groups are reacted via hydrosilation with silicon hydride containing monomers or polymers (including any of the silicon hydride containing polymers disclosed in this application). Examples of these monomers include but are not limited to styrene monomer, divinyl benzene, or low molecular weight polybutadiene. The amounts of reactants range from a silicon hydride/ unsaturated hydrocarbon group ratio of approximately 9/1 up to approximately 1/2 on a molar basis, with the approximately 1/2 having the highest carbon content. Current PDCs successfully used as battery anode materials range from approximately 6:1 to approximately 1.2/1. It is theorized that the hydrosilation of the cyclic polyenes results in a ceramic where the carbon rich regions are highly strained and better able to withstand lithiation/delithiation cycling in a manner similar to graphite. However, these regions are "electrically close" to silicon atoms such that the specific capacity is substantially greater than graphite alone and even higher than a mixture of micron level silicon particles and graphite or other forms of carbon.

Once synthesized, the resulting PDC precursors can be further reacted with one or more, hydride containing, vinyl containing, or allyl containing monomers or polymers to assist in crosslinking using platinum based catalysts, peroxide based initiators/catalysts, or organometallic catalysts. Vinyl containing monomers include but are not limited to: divinyl benzene, divinyltetramethyldisiloxane, or tetramethyltetravinylcyclotetrasiloxane. Vinyl containing polymers include but are not limited to polydimethylvinylsiloxane, polyphenylmethylvinylsiloxane, polydimethylvinylsiloxane, and polydimethyldiphenylvinylsiloxane (which are polymers synthesized in the art described in Silicon alkoxide-derived PDC ceramics below.)

The catalysts utilized to crosslink the resins in the art prior to pyrolysis are typically utilized as at approximately 0.25% to approximately 4% concentration based on the mass of the resin. The types of catalysts include those based on platinum, such as Ashby's catalyst; organic peroxides, such as dicumyl peroxide; or organometallic catalysts, such as zinc octoate. There are many variants of each type that will work and any commercially available catalyst of each type is expected to be effective.

Any of these polymers, with or without crosslinking additives can also be cured without any type of catalyst by heating to approximately 160 to approximately 250 C in nitrogen or other inert gas.

Tables 1 and 2 below show the PDC Starting material compositions for the invention.

TABLE 1

Starting Materials for High Capacity Battery Anode Compositions and Thermosetting Compositions

| Group A Hydride Substituents on Silicon | Group B Vinyl Containing Organic Modifiers | Group C Crosslinkers | Group D Catalysts |
|---|---|---|---|
| Methylhydrogen fluid | Dicyclopentadiene | Divinyl Benzene | Platinum containing |
| Polymethylhydrogen siloxane | Styrene | Divinyltetramethyl disiloxane | Peroxide containing |
| 2,4,6,8-Tetramethylcyclotetrasiloxane | Low viscosity polybutadiene | | Organometallic catalyst |
| Dimethylsiloxane-polymethylhydrosiloxane copolymer | Any cyclic diene with 1 or more unsaturated groups | Tetravinyltetramethyl cyclotetrasiloxane | |
| Diphenylsiloxane-polymethylhydrosiloxane copolymer | | Any vinyl containing thermoplastic PDC formulation from Table 4 | |
| Methylphenylsiloxane-polymethylhydrosiloxane copolymer | | | |
| Diphenylsilane | | | |
| Phenylsilane | | | |

TABLE 2

Claimed and Preferred Compositions of Starting Materials for Battery Anode PDCs and Thermosetting PDCs- Based on Mass % and Totaling to 100%

| Claimed Composition Range | Preferred Composition Range (totaling 100%) | Most Preferred Composition Range (Totaling 100%) |
|---|---|---|
| 1 or more from Group A + 0-2 from Group B + 0-2 from Group C + 1 or more from Group D | 35% to 75% from Group A + 25% to 65% from Group B + 5% to 50% from Group C + 0.1% to 4% from Group D | 40-70% from Group A + 33-65% from Group B + 10-50% from Group C + 1-3% from Group D |

For each of the minimum and maximum values in the ranges referenced in the above table, the amounts cited can be approximate (or approximately) values. Thus, the minimum and maximum approximate values can include +/−10% of the amount referenced. Additionally, preferred amounts and ranges can include the exact minimum and maximum amounts referenced without the prefix of being approximate.

A second embodiment of the present invention is the preparation of Silicon Alkoxide-Derived PDC Ceramics for use as battery anode materials comprised of the pyrolyzed result of polymer precursors synthesized by the acid or base hydrolysis/condensation/polymerization of silicon alkoxides. The types of silicon alkoxide monomers include Methoxysilanes, Ethoxysilanes, Propoxysilanes, and butoxysilanes which are silicon atoms with one or more alcohol groups attached to the silicon atom, there can be up to 4 alcohol groups attached to the silicon atom, for example, Tetraethoxysilane or "TEOS". The alcohols reacted to form the alkoxide group attached to the silicon can range from methanol to butanol, for example a silicon reacted with methanol would have up to 4 methoxy groups attached and is called "TMOS".

Other alkoxides such as tin, titanium, germanium, lithium, aluminum, zirconium, lead, etc. can also be reacted during the silicon alkoxide synthesis process to add these metals or oxides into the resulting ceramic.

The preferred alkoxysilanes for synthesizing battery anode PDC precursor materials are silicon ethoxysilane type monomers (primarily for cost reasons) although silicon methoxysilanes, propoxysilanes, butoxysilanes can also be used if cost effective.

The ethoxysilane monomers that can be utilized to produce battery anode PDC precursors include but are not limited to the following: Phenyltriethoxysilane, Diphenyldiethoxysilane, Phenylmethyldiethoxysilane, Vinylphenyldiethoxysilane Methyltriethoxysilane, Dimethyldiethoxysilane, Methyldiethoxysilane, Triethoxysilane, Methylvinyldiethoxysilane, Vinyltriethoxysilane, Trimethylethoxysilane, and Tetraethoxysilane.

The methoxy analogs of the above, as well as propoxy or butoxy analogs could also be used, but the reaction efficiency of polymerization decreases as the number of carbon atoms in the alkoxy group increases.

In addition, battery anode material PDC precursors can be synthesized by hydrolysis/polymerization/condensation of the corresponding chlorosilane analogs to the monomers listed above.

The PDC precursors are produced by acid catalysis of a range of mixtures of ethoxysilanes, that are cured using platinum, peroxide, or organometallic catalysts and designed to provide high ceramic yield, high silicon content and pyrolyzed ceramic microstructure after pyrolysis at approximately 900 to approximately 1200 C that provides both electrical conductivity and a stable structure to withstand many lithiation/delithiation cycles without damage while still taking advantage of the capacity increase due to the high silicon content.

The mole percentage of each of the monomers can range from 0 to approximately 90%. However, a typical formulation would be something with phenyl containing monomers in the approximately 10 to approximately 80% and the methyl containing monomers in the approximately 10 to approximately 50% range and the vinyl containing monomers in the 0 to approximately 60% range. The hydride containing monomers (Methyldiethoxysilane and Triethoxysilane) would be used sparingly (approximately 5 to approximately 35%) due to cost considerations.

The polymers produced by the above process would be crosslinked via catalysis using platinum based, peroxide based, or organometallic catalysts as described previously.

The polymers described in the Silicon Alkoxide-Derived PDC Ceramics could also be crosslinked by the addition of more unsaturated hydrocarbon containing monomers or polymers (including polymers synthesized according to the process for preparing Silicon Hydride-Containing PDC Ceramics disclosed above). The list of unsaturated hydrocarbon containing materials is also the same as for the process for preparing Silicon Hydride-Containing PDC Ceramics. Silicon hydride containing monomers and polymers could also be used as crosslinking agents.

The catalysts utilized to crosslink the resins in the art prior to pyrolysis are typically utilized as at approximately 0.25% to approximately 4% concentration based on the mass of the resin. The types of catalysts include those based on platinum, such as Ashby's catalyst; organic peroxides, such as dicumyl peroxide; or organometallic catalysts, such as zinc octoate. There are many variants of each type that will work and any commercially available catalyst of each type is expected to be effective.

Any of these polymers, with or without crosslinking additives can also be cured without any type of catalyst by heating to approximately 160 to approximately 250 C in nitrogen or other inert gas.

Examples of PDC formulation ranges that produced improved anode materials include materials with approximately 55% silicon hydride content which, after pyrolysis, produced anodes with a reversible capacity of approximately 450 mAh/g. This is compared to graphite which has a maximum theoretical capacity of approximately 372 mAh/g and an operational capacity of approximately 360 mAh/g.

Figure 7:
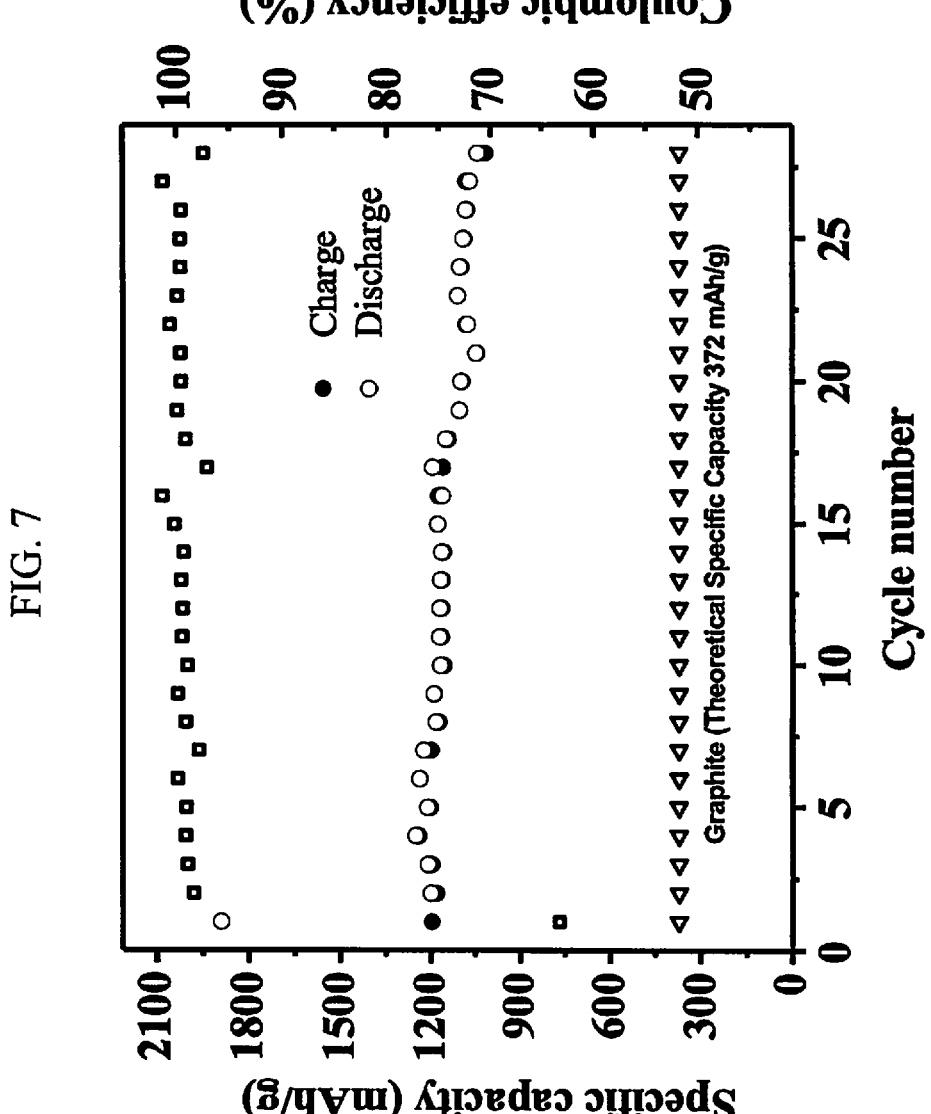
FIG. 7 is a graph of charge/discharge for a half-cell vs Li/Li$^+$ of specific capacity in range from approximately 300 to approximately 2100 mAh/g verses cycle number with coulombic efficiency for an anode consisting of a formulation in the thermoset category as found in Example 1.
Figure 8:
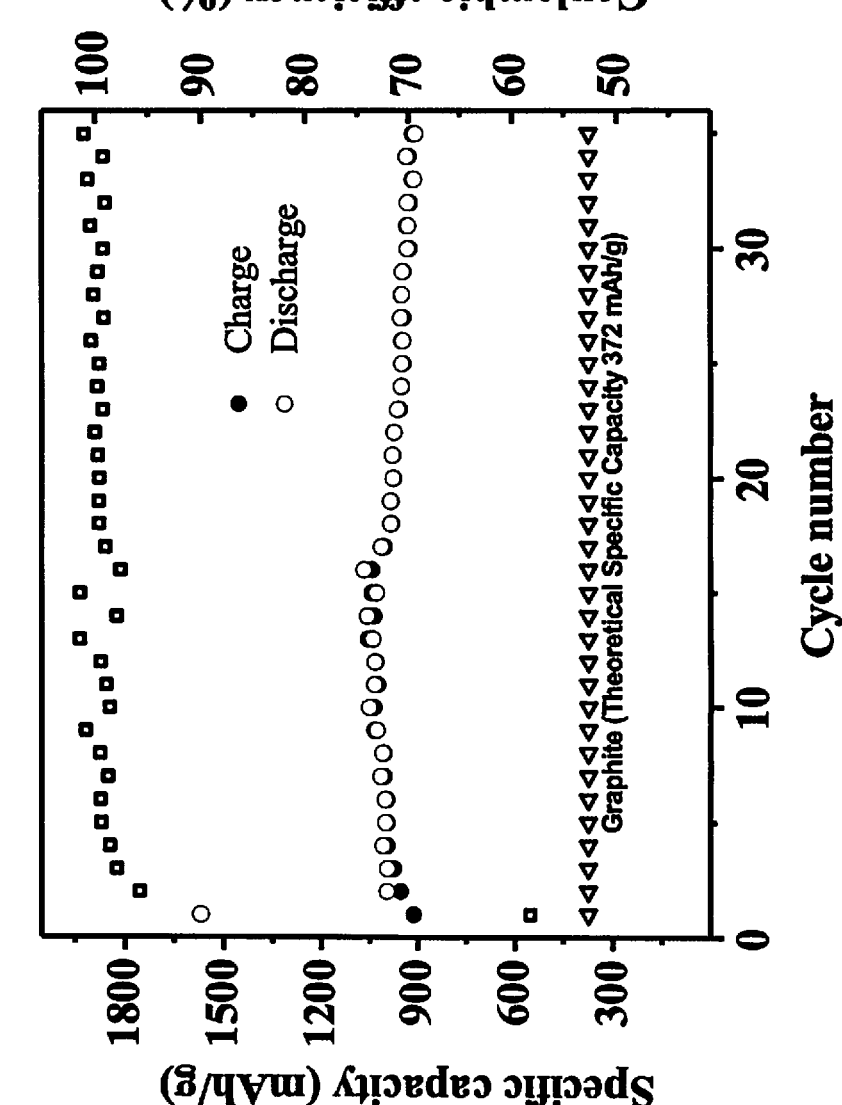
FIG. 8 is a graph of charge/discharge for a half-cell vs Li/Li$^+$ of specific capacity in a range from approximately 300 to approximately 1800 mAh/g verses cycle number with coulombic efficiency for an anode consisting of a formulation in the thermoset category as found in Example 1.

After pyrolysis to ceramic, material with approximately 18% silicon hydride starting content produced anode materials with a specific capacity of approximately 930 to approximately 997 mAh/g, which is nearly 3 times that of graphite, as shown in FIG. 8. By controlling the ratio of silicon, oxygen, and carbon, other ceramic materials have been demonstrated to achieve nearly approximately 1,200 mAh/g (currently approximately 1,043 mAh/g), which is over 3 times that of graphite, as shown in FIG. 7. It is expected that further modification of the compositions and microstructures will result in higher specific capacities.

Tables 3 and 4 provide the range of starting material compositions for the PDCs described in the preparation of Silicon Alkoxide-Derived PDC Ceramics.

TABLE 3

Starting Materials for High Capacity Battery Anode from Silicon
Alkoxide-Derived PDCs and Thermoplastic Polymers.

| Group 1 Phenyl alkoxysilanes | Group 2 Methyl Alkoxysilanes | Group 3 Vinyl Alkoxysilanes | Group 4 Catalysts | Group 5 Crosslinkers (optional) |
|---|---|---|---|---|
| Phenyl trialkoxysilane Phenylmethyl dialkoxysilane Diphenyl dialkoxysilane | Methyltrialkoxysilane Dimethyldialkoxysilane Methyldialkoxysilane | Vinyltrialk oxysilane Vinylmethyl dialkoxysilane | Platinum containing Peroxide containing Organometallic catalyst | Methylhydrogen fluid Polymethylhydrogen siloxane Tetramethyl tetracyclotetrasiloxane Any hydride containing PDC formulation from Table 2 Diphenylsilane Phenylsilane divinylbenzene |

Alkoxysilanes or the corresponding chlorosilanes will produce the same range of PDC compositions. Alkoxysilanes for the present invention are: Methoxysilanes, Ethoxysilanes, Propoxysilanes, or Butoxysilanes wherein methoxysilanes and ethoxysilanes are preferred.

rials. For example, a high silicon content PDC precursor can be coated onto the surface of conductive carbon, natural graphite, synthetic graphite, carbon nanotubes, graphene platelets, coal powders, thereby increasing the specific capacity of the resulting ceramic composite.

TABLE 4

Claimed and Preferred Compositions of Starting Materials for Battery
Anodes from Silicon Alkoxide-Containing PDCs Compositional ranges
are based on Mass % and Totaling to 100%.

| Claimed Composition Range | Preferred Composition Range (totaling 100%) | Most Preferred Composition Range |
|---|---|---|
| 1 or more from Group 1; + 0-3 from Group 2; + 0-2 from Group 3; + 1 or more from Group 4; + 0-1 from Group 5 | 40% to 100% from Group 1; 25% to 65% from Group 2; + 5% to 50% from Group 3; + 0.5% to 4% from Group 4; + 0% to 50% from Group 5 | 50-80% from Group 1; + 10-35% from Group 2; + 20-50% from Group 3; + 2-3% from Group 4; + 10-40% from Group 5 |

For each of the minimum and maximum values in the ranges referenced in the above table, the amounts cited can be approximate (or approximately) values. Thus, the minimum and maximum approximate values can include +/−10% of the amount referenced. Additionally, preferred amounts and ranges can include the exact minimum and maximum amounts referenced without the prefix of being approximate.

A third embodiment of the PDC precursor polymers discussed in the above sections is that they can be utilized as an additive to improve existing graphite anode materials. For example, a mixture of approximately 8% silicon containing PDC coated and pyrolyzed onto graphite powders provides an approximately 20% increase in specific capacity over the baseline graphite, as shown in FIG. 9.

Figure 12:
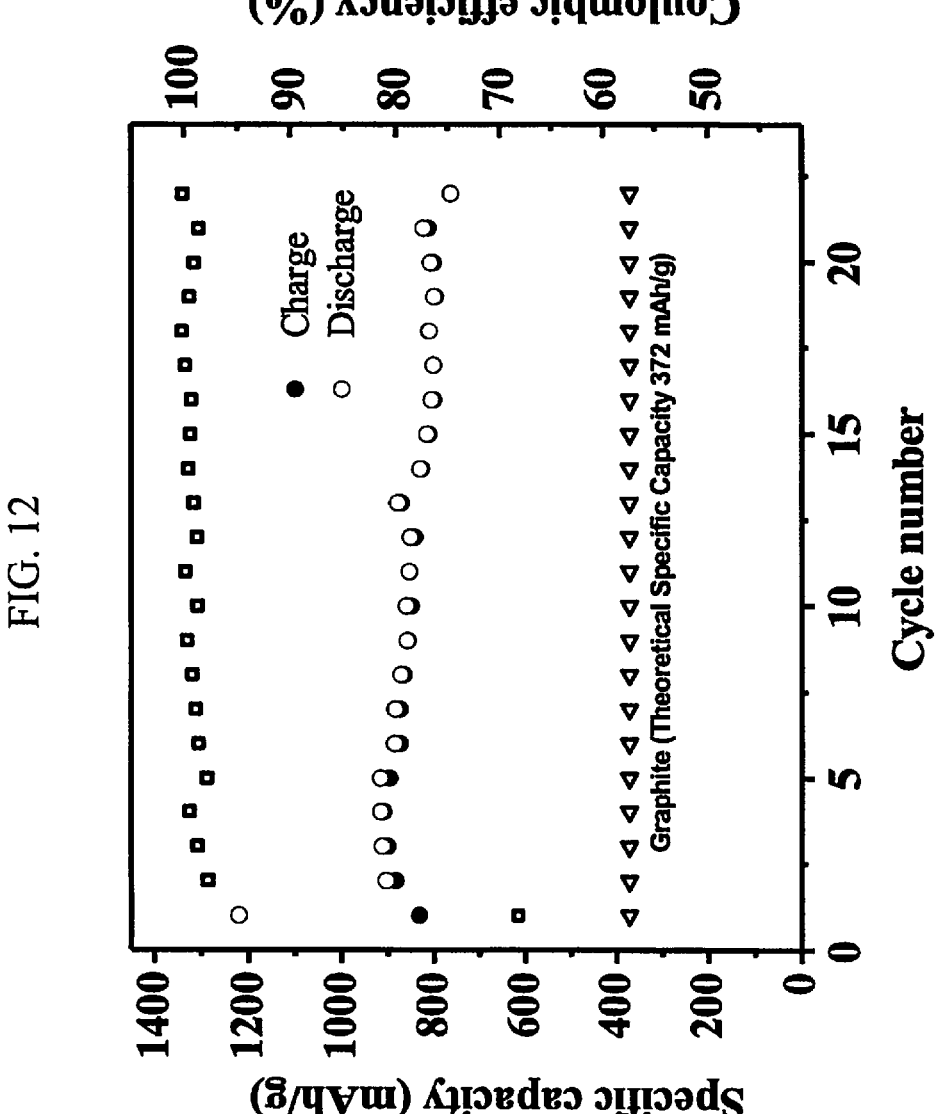
FIG. 12 is a graph of charge/discharge for a half-cell vs Li/Li$^+$ of specific capacity in a range from approximately 200 to approximately 1400 mAh/g verses cycle number with coulombic efficiency for an anode comprised of approximately 10% coal and approximately 90% of a resin formulation in the thermoset category as found in Example 1.

The PDCs of the invention can be mixed with any electrically conductive, or otherwise beneficial filler mate- The amount of filler in the PDC can vary from approximately 1% up to approximately 90% by mass, depending on the density of the filler. For example, adding approximately 10% ground coal powder can increase the specific capacity by approximately 30% while slightly decreasing the cost (FIG. 12). Using conductive carbon as a filler shows a capacity increase of approximately 50% over the baseline carbon material. Other beneficial fillers that have been used include tin, titanium, and submicron silicon. Many of the precursor materials contain sufficient silicon hydride that the hydride will reduce the silica (silicon oxide) layer on the silicon powder, resulting in much better bonding of the silicon into the PDC matrix, and a stronger support structure for the silicon.

Tables 5, 6 and 7 below provide the fillers and compositions:

TABLE 5

Battery Anode Compositions: Silicon-containing PDCs with Fillers

| Group X PDC Polymers | Group M Graphite/Carbon Powder | Group N Carbon Nano Materials | Group O Other Fillers |
|---|---|---|---|
| Thermosetting Silicon Hydride | Synthetic Graphite | Carbon Nanotubes | silicon micro or nanopowders |

TABLE 5-continued

| Battery Anode Compositions: Silicon-containing PDCs with Fillers | | | |
|---|---|---|---|
| Group X PDC Polymers | Group M Graphite/Carbon Powder | Group N Carbon Nano Materials | Group O Other Fillers |
| Containing PDC polymers from the 1st embodiment (catalyzed or uncatalyzed) Thermoplastic Polymers Silicon Alkoxide Containing PDCs from the 2nd embodiment (catalyzed or uncatalyzed) | Natural Graphite | Graphite nanofibers | titanium or titanium-based micro or nanopowders |
| | Purified Graphite | Milled Graphite Fibers | zirconium or zirconium-based micro or nanopowders |
| | Bituminous Coal | Carbon Black | tin or tin-based micro or nanopowders |
| | Other Coal-Anthracite, sub-bituminous, lignite, peat | Graphene materials | copper or copper-based nanopowders aluminum or aluminum-based nanopowders Lithium or lithium based compounds |

The PDC polymers of Group X can have separate applications since one is of the thermosetting and one is of the thermoplastic. For example, thermosetting is less expensive than thermoplastic and can be desirable in more cost dependent applications.

Thermoplastic will have higher performance and can be compatible with a wider range of filler materials and is recyclable. Thermosetting and thermoplastic silicon hydrates unlike other polymers are inorganic, which also separates them from other organic polymers.

The group M listing of graphite carbon powders can be separated as graphite materials as compared to non-graphite materials, and each of the listed components can have separate applications and benefits.

Synthetic Graphite can have separate applications and benefits such as being used to improve cycling life when compared to others such as natural graphite.

Natural Graphite can have separate applications and benefits such as being used to improve cycling capacity when compared to others such as synthetic graphite.

Purified Graphite can have separate applications and benefits such as being used to improve both cycling life and cycling capacity.

Non-graphite carbon materials such as Bituminous Coal and other types of coal, such as Anthracite, sub-bituminous, lignite, peat, and mixtures thereof can each have separate applications and benefits. They can be categorized by having low, medium or high volatiles and a low, medium or high carbon content. Typically, volatiles are related to the amount of porosity created during pyrolysis and are beneficial for improving capacity and cycling life. For example, low volatiles typically result in lower porosity/capacity. Typically, carbon content is directly related to material conductivity after pyrolysis. For example, typically low carbon content means low conductivity.

Bituminous Coal can have separate applications and benefits such as having medium volatiles coupled with medium carbon content, which can help to increase porosity/capacity and improve conductivity respectively.

Anthracite can have separate applications and benefits such as having high carbon content, which can help to improve conductivity.

Lignite can have separate applications and benefits such as having high volatiles, which can increase porosity/capacity and is cost effective.

Peat can have separate applications and benefits such as being used for having high volatiles, which can increase porosity/capacity and is very cost effective.

TABLE 6

| Silicon-containing PDCs with Fillers. Approximate compositional ranges are based on mass % and totaling to 100%. | | |
|---|---|---|
| Claimed Composition Range | Broad Composition Range (totaling 100%) | Narrowed Composition Range (totaling 100%) |
| 1 from Group X; + | 10% to 90% from Group X; + | 10-60% from Group X; + |
| 0-4 from Group M; + | 10% to 90% from Group M; + | 40-90% from Group M; + |
| 0-4 from Group N; + | 0% to 20% from Group N; + | 0-10% from Group N; + |
| 0-4 from Group O | 0% to 20% from Group O | 0-15% from Group O |

For each of the minimum and maximum values in the ranges referenced in the above table, the amounts cited can be approximate (or approximately) values. Thus, the minimum and maximum approximate values can include +/−10% of the amount referenced. Additionally, preferred amounts and ranges can include the exact minimum and maximum amounts referenced without the prefix of being approximate.

TABLE 7

Silicon-containing PDCs with Fillers. Approximate preferred
compositional ranges based on mass % and totaling to 100%

| Preferred Cost-Effective Composition Range (totaling 100%) | Preferred High-Performance Composition Range (totaling 100%) |
| --- | --- |
| 1-20% from Group X; + 80-99% from Group M; + 0-10% from Group N; + 0-10% from Group O | 70-99% from Group X; + 1-30% from Group M; + 0-20% from Group N; + 0-20% from Group O |

The preferred cost-effective composition range includes Group M subsets within that range that can separately consist of 80-85%, 86-90%, 91-95%, 96-99%. The PDC being selected from Group X, +.

Generally, increasing the percentage of filler (such as graphite carbon material selected from synthetic graphite, natural graphite, purified graphite, bituminous coal, anthracite coal, sub-bituminous coal, lignite, peat and mixtures thereof) in the PDC-based system will decrease the overall cost of the final material system.

The high-performance composition range includes Group X subsets within that range that can separately consist of 70-75%, 76-80%, 81-85%, 86-90%, 91-95%, and 96-99%.

Generally, decreasing the percentage of filler (such as graphite carbon material selected from synthetic graphite, natural graphite, purified graphite, bituminous coal, anthracite coal, sub-bituminous coal, lignite, peat and mixtures thereof) in the PDC-based system will increase the overall cost of the final material system.

For each of the minimum and maximum values in the ranges referenced in the above table and in each of the subset ranges referenced above, the amounts cited can be approximate (or approximately) values. Thus, the minimum and maximum approximate values can include +/-10% of the amount referenced. Additionally, preferred amounts and ranges can include the exact minimum and maximum amounts referenced without the prefix of being approximate.

A fourth embodiment of the invention is the incorporation of other elements besides silicon, carbon, and oxygen into the anode materials by using one or both of the following methods:

A) Utilizing the reducing capability of the silicon hydride constituent of the PDC precursor to reduce organometallic materials such as tin containing, zinc containing, or other organometallic materials such as nickel, cobalt, manganese, titanium, zirconium, and lithium containing organics. This technique has been demonstrated to produce a uniform dispersion of tin in the cured PDC and expected to produce a tin-doped PDC with further improved properties for a battery anode.

B) Utilizing metal containing alkoxides, metal containing chlorides, or metal containing hydroxides to add metals to the PDC precursor formulation during the initial condensation/polymerization/hydrolysis synthesis stage. In this manner any metal that can be made into an alkoxide, chloride or hydroxide can be incorporated into PDC electrode material.

An example would be to add titanium isopropoxide to a formulation during the initial synthesis and reacting to form titanium-silicon oxide on the PDC precursor molecule and have it carry through to the subsequent PDC after pyrolysis. Any alkoxide, chloride, or hydroxide could also be added to the initial PDC precursor after synthesis via reacting with the assistance of an organometallic catalyst such as zinc octoate.

EXAMPLE 1

Process for Producing Battery Anode Materials from Thermosetting PDC Polymer Compositions (Silicon Hydride Containing):
Materials:
1. Methylhydrogen siloxane (MHF)
2. Dicyclopentadiene (DCPD)
3. approximately 2% platinum catalyst (PtC)
4. Tetravinyltetramethylcyclotetrasiloxane (TVC)
Synthesis Procedure:
A 5 liter 4-necked round bottom jacketed flask is set up with a mechanical stirrer and a condenser at one neck.

3 kg of methylhydrogen siloxane is added to the flask.

The flask is then stirred and heated to roughly 30° C. and 2 ppm of platinum from the catalyst solution is added. The siloxane will bubble and foam and the temperature will rise 4-5° C.

Once the temperature stops rising, 1 kg of dicyclopentadiene is added to the siloxane.

The temperature will begin to rise as the hydrosilation reaction begins. Once the temperature reaches approximately 85° C., the temperature will rise very rapidly to a maximum in the range of approximately 165 to approximately 180° C. and quickly begin to fall.

The reaction is complete when the polymer cools down to room temperature.

Once the polymer is cooled to room temperature, approximately 600 grams of tetravinyltetramethylcyclotetrasiloxane is added while the polymer is still stirring in the flask.

The composition of the polymer can easily be changed by changing the ratio of MHF to DCPD and/or changing the crosslinker from TVC to another material such as divinylbenzene. Changing the composition of the polymer or changing the type of reactants changes the composition and structure of the resulting ceramic.

EXAMPLE 2

Process for Producing Battery Anode Materials from Thermosetting or Thermoplastic PDC Polymer Compositions (Silicon Alkoxide Containing):
Materials:
1. Phenyltriethoxysilane
2. Dimethyldiethoxysilane
3. Vinyltriethoxysilane
4. Diphenyldiethoxysilane
5. Acetone or ethanol
6. Acid/water solution pH 1.5-2
Synthesis Procedure:
A 5 liter 4-necked round bottom jacketed flask is set up with a mechanical stirrer and a condenser at one neck.

Approximately 345 grams of acetone and approximately 210 grams of the pH 2 water are mixed in the 5 liter flask.

The ethoxysilanes are mixed together prior to pouring into the acetone water mixture. (Other alkoxysilanes can be substituted, as can chlorosilanes as long as they have the same substituents (phenyl, methyl, vinyl etc.) e.g., Phenyltrichlorosilane, or phenyltrimethoxysilane The ratio by mass of ethoxysilanes for this example is: (it can vary depending on the desired structure of the polymer and resulting pyrolyzed ceramic)

Phenyltriethoxysilane: approximately 57.5%

Dimethyldiethoxysilane: approximately 12.5%

Vinyltriethoxysilane: approximately 5%

Diphenyldiethoxysilane: approximately 25%

Once blended, the ethoxysilanes (in this case 1 kg of liquid) are mixed into the water/acetone mixture via an addition funnel over an approximately 5 minute period (~approximately 200 g/min.).

The mixture will self-heat from roughly room temperature to about approximately 40 to approximately 45° C. over about 30 minutes. The flask is then heated until the silane/acetone/water mixture is stable at approximately 62 to approximately 68° C. (the final reflux temperature depends on the silane composition). The reaction is run at near reflux temperature for a minimum of approximately 20 hours.

The mixture is allowed to cool to below approximately 30° C. before removal from the flask.

The polymer/acetone/water mixture is poured into a 6 liter separatory funnel already containing approximately 1.8 liters of distilled water. The whole flask is shaken or vigorously stirred for 1 minute before being set back into its stand to allow the polymer to settle out of the mixture. After a minimum of 1 hour, the resulting slightly amber polymer should be visible with a very defined separation line between the polymer (lower amber liquid) and the water/acetone (upper cloudy liquid).

The bottom stopcock can be used to drain the polymer into a pan while leaving the water/acetone mixture in the funnel.

The polymer still contains some solvent and water, so it is dried by either setting pan containing the polymer in a mechanical convection oven set at approximately 80° C. for approximately 2 hours or by using a Rotovap or wiped film still to remove the residual water and acetone.

Once dried, the polymer will be a somewhat viscous (viscosity depends on composition) liquid that is ready to be cured with or without a catalyst and/or crosslinker as described in the process for producing ceramic powder from the PDC Polymer discussed below.

EXAMPLE 3

Producing and Using Ceramic Powder from the PDC Polymer in a Battery Anode

This procedure is a generic example describing a typical process used with the PDC producing polymers and filled polymer systems described in the invention. The process below is used to produce a pyrolyzed PDC polymer in powder form:

Step One: approximately 50 grams of either thermosetting or thermoplastic polymer are poured into a plastic beaker and mixed with approximately 20 ppm of platinum from the catalyst solution.

Step Two: The mixture is stirred for 2 minutes with a spatula to mix in the catalyst.

Step Three: The catalyzed polymer is then poured in roughly equal amounts into two 2.5" diameter aluminum pans.

Step Four: The pans are placed into a convection oven set to approximately 50° C. and heated according to the following schedule:

approximately 1 hour at approximately 50° C.; approximately 2 hours at approximately 80° C.; approximately 2 hours at approximately 110° C. and approximately 2 hours at approximately 130° C. followed by a slow cooldown.

Step Five: The resulting material is a cured PDC polymer that forms a "hard plastic" disk that typically is easy to remove from the aluminum pan.

Step Six: The disks are then crushed with a roller-crusher system into a fine powder prior to pyrolysis.

Step Seven: The cured polymer powder from Step Six is placed into a quartz or alumina ceramic boat and placed in the hot zone of an approximately 1100° C. capable inert gas furnace.

Step Eight: The furnace is sealed and purged with flowing nitrogen or argon to remove oxygen and heated according to the following cycle:

approximately 400° for approximately 4 hours; approximately 600° C. for approximately 4 hours; approximately 800° C. for approximately 4 hours; and approximately 1000° C. for approximately 4 hours, followed by a slow cool to room temperature while still under inert gas wherein the powder is agglomerated during pyrolysis into ceramic.

Step Nine: The ceramic material is then placed into a small attritor and ground down to the required approximately 1 to approximately 20 microns required for mixing with the binder materials to form the anode slurry.

TABLE 8

Battery Anode Compositions: PDC with Fillers

| Group X PDC Polymers | Group M Graphite/Carbon Powder | Group N Carbon Nano Materials | Group O Other Fillers |
|---|---|---|---|
| Thermosetting PDC polymers from Ex. "1" above (catalyzed or uncatalyzed) | Synthetic Graphite | Carbon Nanotubes | Silicon micro or nanopowders |
| Thermoplastic Polymers from Ex. "2" above (catalyzed or uncatalyzed) | Natural Graphite | Graphite nanofibers | Titanium or titanium-based micro or nanopowders |
| | Purified Graphite | Milled graphite fibers | Zirconium or zirconium-based micro or nanopowders |
| | Bituminous Coal | Carbon black | Tin or tin-based micro or nanopowders |
| | Other Coal- Anthracite, sub- bituminous, lignite, peat | Graphene Materials | Copper or copper- based nanopowders |
| | | | Aluminum or aluminum-based nanopowders |
| | | | Lithium or lithium based compounds |

Figure 1:
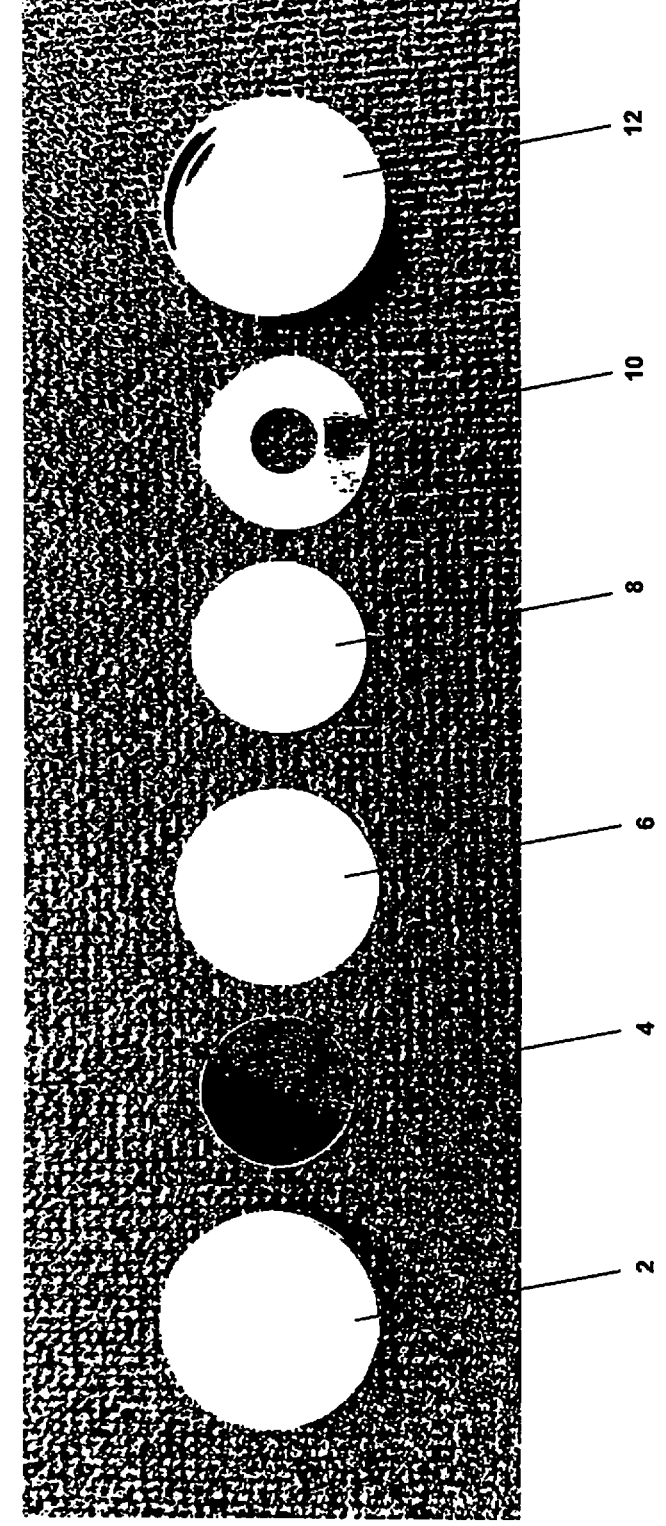
FIG. 1 shows the components of a typical coin cell battery using lithium as the counter electrode (half-cell).

FIG. 1 is a prior art representation of components in a typical coin cell battery using lithium as the counter electrode (half-cell). The components are assembled in a stacked arrangement beginning with a negative cap 2 on one end, an active material coated on copper foil 4, a microporous separator 6, then a spacer 8 and lithium foil (not pictured), next is a spring 10, and a positive cap 12 at the opposite end from the negative cap 2. A typical electrolyte used is $LiPF_6$ (lithium hexafluorophosphate) in 1:1 ethylene carbonate (EC):dimethyl carbonate (DMC).

A typical electrode fabrication process consists of the following steps:

1. Mixing the Polyvinylidene Fluoride (PVDF) with N-Methyl-2-Pyrrolidone (NMP) solvent for approximately 24 hours
2. If necessary, mix varying amounts of Conductive Carbon Additive to the PVDF/NMP slurry for at least approximately 3 hours
3. Grinding the ceramatized resin down to a fine powder using a mortar and pestle (Active Material)
4. Mix in varying amounts of Active Material for approximately 24 hours
5. Slurry-coat mixture onto clean, high-purity copper foil
6. Dry electrode under vacuum for approximately 24 hours at varying temperatures
7. Press and punch electrode material to desired thickness and shape
8. Dry electrode under vacuum for at least approximately 12 hours
9. Assemble in coin cell FIG. 2A represents an overview of LCO/NMC, NMC and LFP commercial battery cells and the components of each battery.

FIG. 2B shows a Mass split (m %) of the main components of the LCO/NMC, NMC and LFP cell species, respectively. Mass breakdown for commercial 18650 batteries. 18650 batteries are commercially available and are considered industrial standard batteries. They are called 18650 because they are 18 millimeters in diameter and 65 millimeters tall.

With different types of cathode materials and graphite as the anode. The mass of each component is shown; LCO/NMC batteries have a mass of 44.3 grams, NMC batteries have a mass of 43.1 grams and LFP batteries have the lowest mass of 39.0 grams. This figure details the potential areas where the overall mass of a commercial battery can be reduced and this will be contingent upon performance of the materials selected. For example: FIG. 7 shows (resin formulation in the thermoset category as found in Example 1) the charge/discharge performance of one of our formulations with a specific discharge capacity of approximately 1043 mAh/g after approximately 28 cycles. If we apply this value to a commercial NMC type battery in FIG. 2B, we can potentially reduce the overall battery mass by ~approximately 10.5% (using the theoretical capacity of graphite approximately 372 mAh/g as the comparison). This is important because reducing the mass increases the specific energy of a battery cell, as discussed by A. W. Golubkov, D. Fuchs, J. Wagner, H. Wiltsche, C. Stangl, G. Fauler, G. Voitic, A. Thaler, V. Hacker, *RSC Adv.* 2014, 4, 3633.

FIG. 3 is a table of the overview of the cell chemistries used in cost calculations for NMC positive electrode batteries with graphite and silicon alloy negative electrodes.

Figure 4:
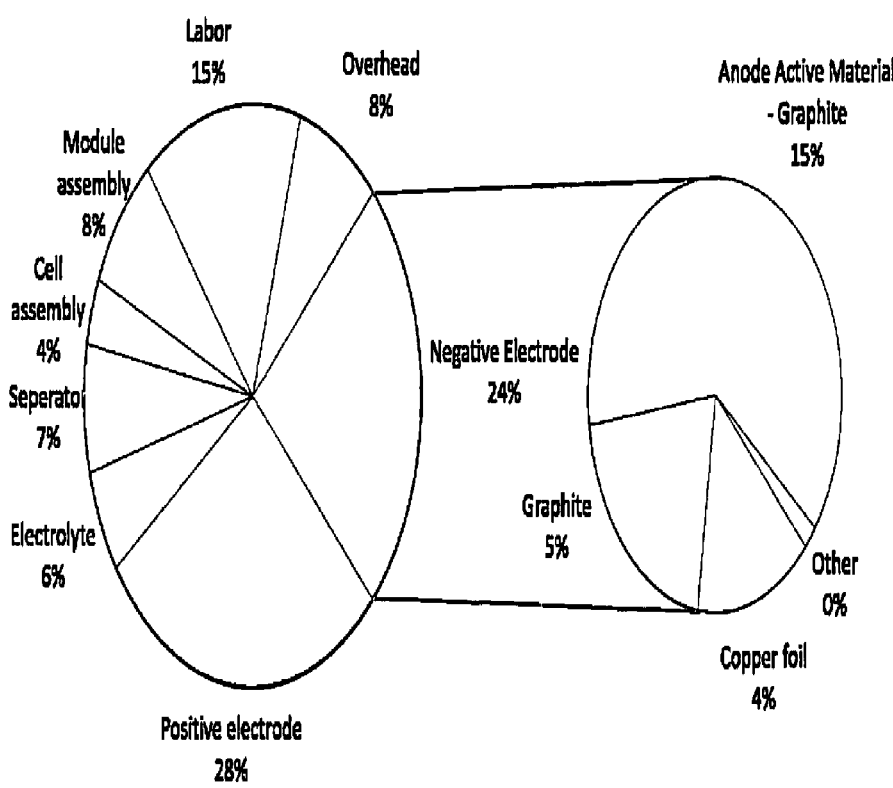
FIG. 4 shows pie charts of the cost breakdown of Battery I with a special focus on the anode composition.
Figure 5:
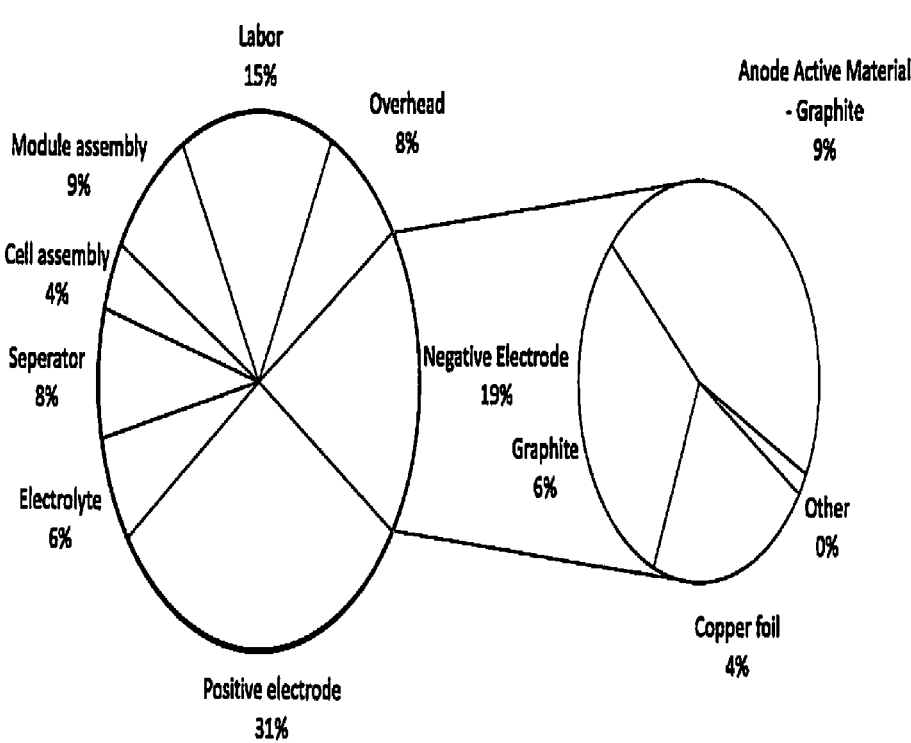
FIG. 5 shows pie charts of a cost breakdown of Battery II with a special focus on the anode composition.

FIG. 4 shows pie charts of the cost breakdown of battery I with graphite in the anode composition. FIG. 5 is a cost breakdown of battery II with a silicon alloy plus graphite in the anode composition. When comparing the costs of low production quantities, the silicon alloy plus graphite anode composition (Battery II) reduces the cost from approximately 432$/kWh to approximately 293$/kWh which is a cost of goods reduction of approximately 32 percent.

In summary, FIGS. 3-5 show the potential the material of the present invention has to reduce the overall cost of a battery. Battery I in this case has graphite as the anode and Battery II has a Si alloy anode. It looks as though the cost for the negative electrode was reduced by approximately 5%, which is a direct reflection of an increase in specific energy. These figures represent a real-life example of how replacing graphite-based anodes with higher performing silicon-based anodes can reduce the overall cost of batteries containing commercial NMC-type cathode materials as discussed by M. M. Gert Berckmans, Jelle Smekens, Noshin Omar, Lieselot Vanhaverbeke and Joeri Van Mierlo, Energies 2017, 10.

FIG. 6 is a Table of material inventories for HEV, PHEV and EV batteries. Referring to FIG. 6, this Table can be found in "Material and Energy Flows in the Materials Production, Assembly, and End of Life Stages of the Automotive Lithium Ion Battery Life Cycle" from Argonne National Laboratory (2012).

This figure details the potential areas where reductions can be made in the overall mass of a commercial battery in hybrid electric vehicles (HEV), plug-in hybrid electric vehicles (PHEV), and electric vehicles (EV). Any reductions will be contingent on performance of materials selected. For example: FIG. 7 shows (resin formulation in the thermoset category as found in Example 1) the charge/discharge performance of one of our formulations with a specific discharge capacity of approximately 1043 mAh/g after 28 cycles. If we apply this value to a commercial battery found in an EV, we can potentially reduce the overall battery mass by ~approximately 10.5% (using the theoretical capacity of graphite approximately 372 mAh/g as the comparison). This is important because reducing the mass, increases the specific energy of a battery cell. The square boxes represent coulombic efficiency for the PDC-based materials only. Coulombic efficiency data is not provided for any control materials such as approximately 100% graphite.

FIG. 7 is a graph of charge/discharge for a half-cell vs $Li/Li^+$ of specific capacity (mAh/g) verses cycle number with coulombic efficiency for an anode consisting of a formulation in the thermoset category as found in Example 1.

Active Material:PVDF:Conductive Carbon Additive 80:10:10

Mass loading: approximately 0.64 mg/cm$^2$

Voltage Window: approximately 0.01-3 V

Current Rate: approximately 91.88 mA/g (62.38 uA/cm$^2$)

FIG. 8 is a graph of charge/discharge for a half-cell vs $Li/Li^+$ of specific capacity (mAh/g) verses cycle number with coulombic efficiency for an anode consisting of a formulation in the thermoset category as found in Example 1.

Active Material:PVDF:Conductive Carbon Additive 80:10:10

Mass loading: approximately 0.64 mg/cm$^2$

Voltage Window: approximately 0.01-3 V

Current Rate: approximately 183.77 mA/g (approximately 124.77 uA/cm$^2$)

Figure 9A:
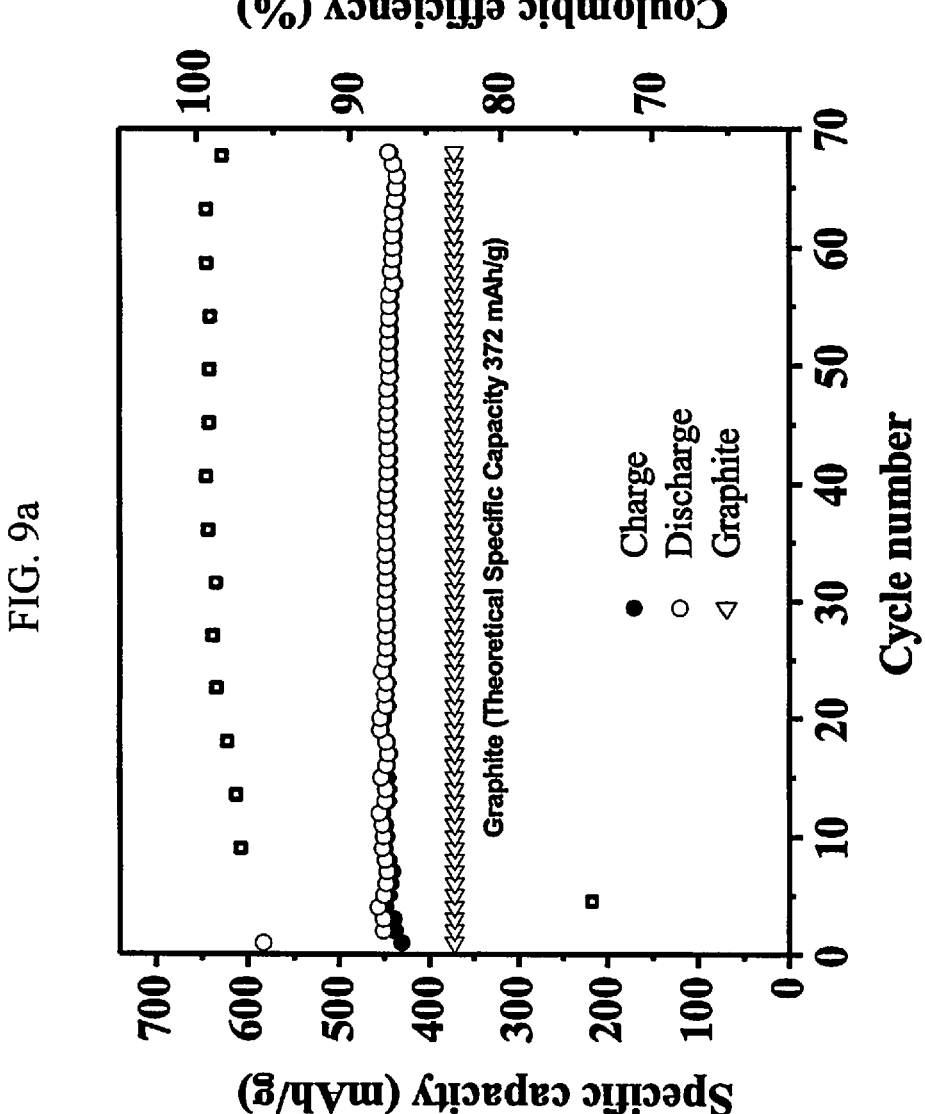
FIG. 9A is a graph of charge/discharge for a half-cell vs Li/Li$^+$ of specific capacity in a range from approximately 100 to approximately 700 mAh/g verses cycle number with coulombic efficiency for an anode containing approximately 92% graphite and approximately 8% of a resin formulation in the thermoset category as found in Example 1.

FIG. 9A is a graph of charge/discharge for a half-cell vs $Li/Li^+$ of specific capacity (mAh/g) verses cycle number with coulombic efficiency for an anode containing approximately 92% Graphite and approximately 8% of a resin formulation in the thermoset category as found in Example 1.

Active Material:PVDF:Conductive Carbon Additive 85:10:5

Mass loading: approximately 2.23 mg/cm$^2$

Voltage Window: approximately 0.01-3 V

Current Rate: approximately 28.01 mA/g (approximately 62.38 uA/cm$^2$)

FIG. 9B shows the specific capacity of the battery in FIG. 9A after approximately 25 cycles and 50 cycles wherein there is only a slight decrease in battery strength of approximately 3.4 mAh/g.

Figure 10:
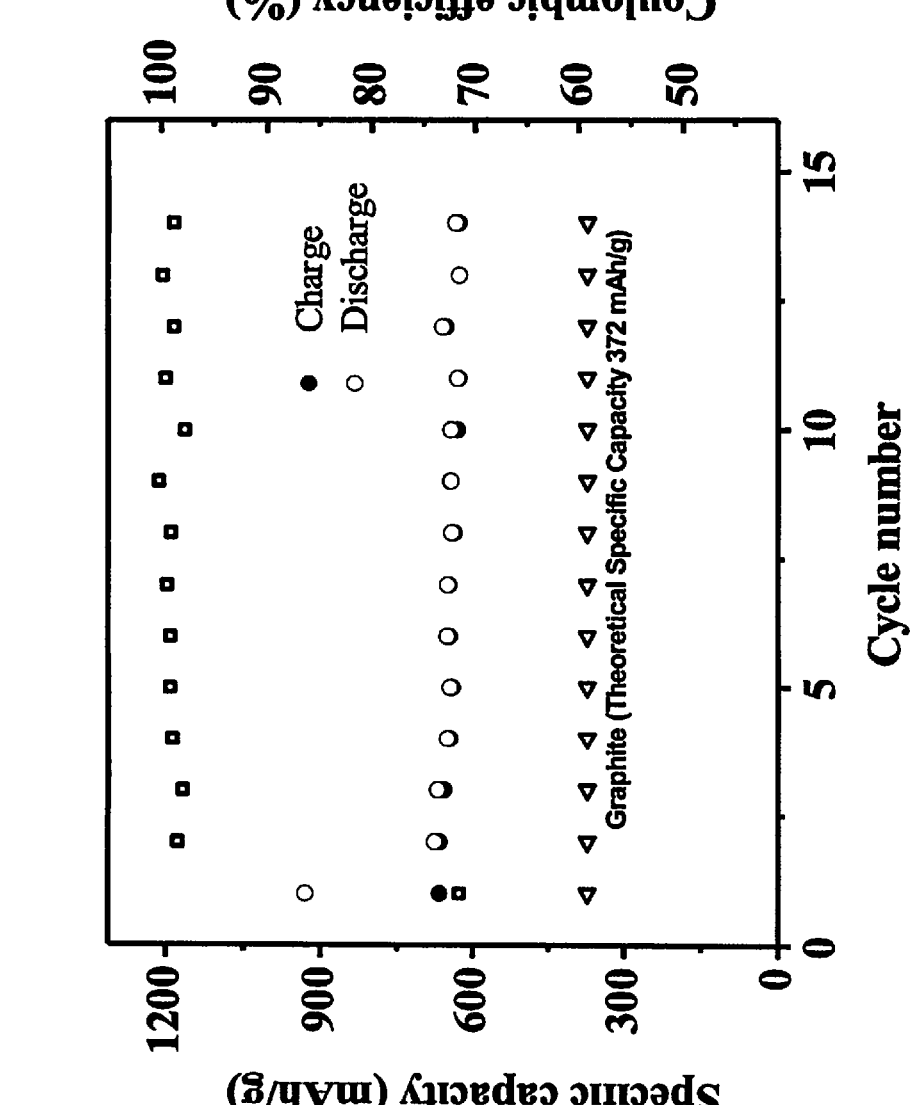
FIG. 10 is a graph of charge/discharge for a half-cell vs Li/Li$^+$ of specific capacity in a range from approximately 300 to approximately 1200 mAh/g verses cycle number with coulombic efficiency for an anode comprised of approximately 5% silicon metal and approximately 95% of a resin formulation in the thermoset category as found in Example 1.

FIG. 10 is a graph of charge/discharge for a half-cell vs Li/Li$^+$ of specific capacity (mAh/g) verses cycle number with coulombic efficiency for an anode comprised of approximately 5% silicon metal and approximately 95% of a resin formulation in the thermoset category as found in Example 1.

Active Material:PVDF:Conductive Carbon Additive 85:10:5

Mass loading: approximately 6.04 mg/cm$^2$

Voltage Window: approximately 0.01 to approximately 3 V

Current Rate: approximately 13.07 mA/g (approximately 78.93 uA/cm$^2$)

Figure 11:
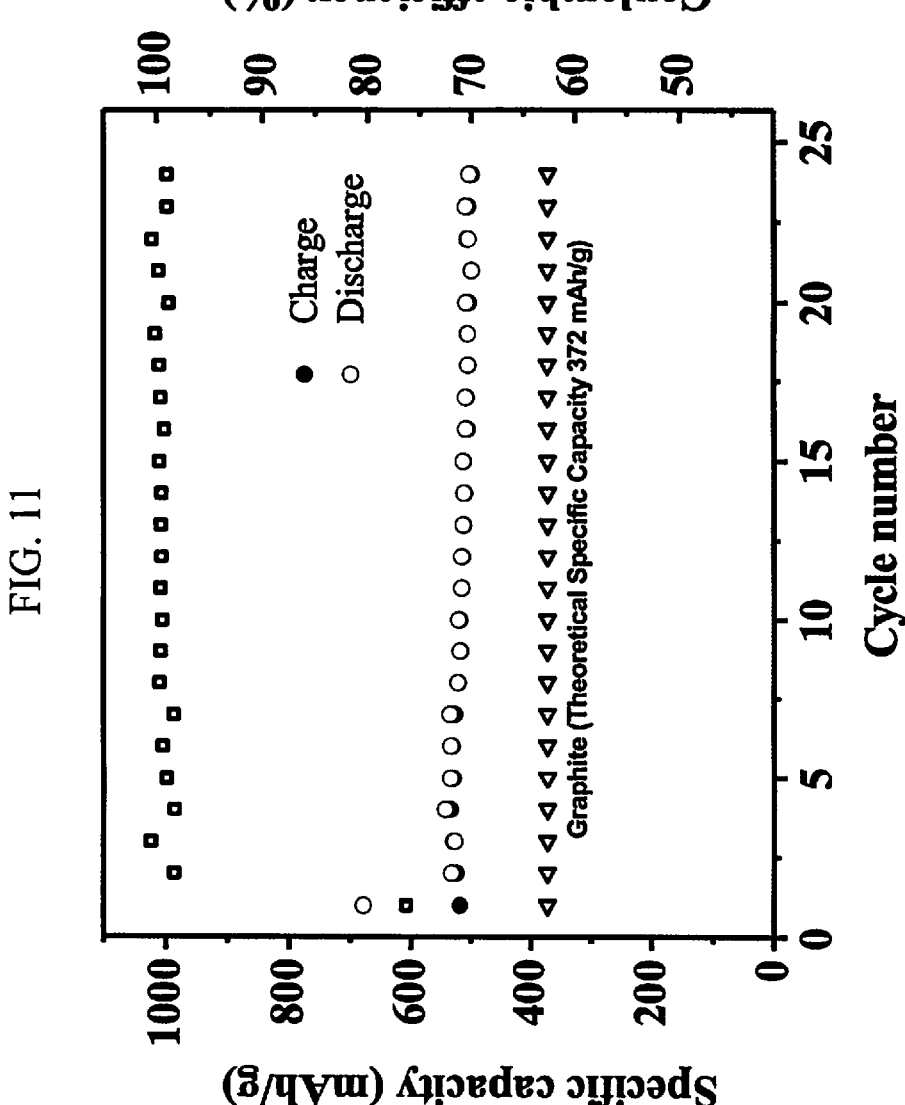
FIG. 11 is a graph of charge/discharge for a half-cell vs Li/Li$^+$ of specific capacity in a range from approximately 200 to approximately 1000 mAh/g verses cycle number with coulombic efficiency for an anode comprised of a resin formulation in the thermoset category as found in Example 1.

FIG. 11 is a graph of charge/discharge for a half-cell vs Li/Li$^+$ of specific capacity (mAh/g) verses cycle number with coulombic efficiency for an anode comprised of a resin formulation in the thermoset category as found in Example 1.

Active Material:PVDF:Conductive Carbon Additive 85:10:5

Mass loading: approximately 5.37 mg/cm$^2$

Voltage Window: approximately 0.01-3 V

Current Rate: approximately 14.71 mA/g (approximately 78.93 uA/cm$^2$)

FIG. 12 is a graph of charge/discharge for a half-cell vs Li/Li$^+$ of specific capacity (mAh/g) verses cycle number with coulombic efficiency for an anode comprised of approximately 10% coal and approximately 90% of a resin formulation in the thermoset category as found in Example 1.

Active Material:PVDF:Conductive Carbon Additive 80:10:10

Mass loading: approximately 1.14 mg/cm$^2$

Voltage Window: approximately 0.01-3 V

Current Rate: approximately 51.59 mA/g (approximately 62.38 uA/cm$^2$)

FIG. 13 is a flow chart of a process for making SiOC powder electrode material with filler.

Referring to FIG. 13, an economic decision will be made for scaled up production whether to make the battery anode PDC polymers via methods similar to those described herein (A) or to purchase the polymer from a specialty chemical toll producer (B). The rest of the process would be continuous or semi-continuous. In either case the polymer/resin 20 would be placed in resin storage 22 prior to use. The catalyst would be added to the polymer as the polymer enters the static mixer 24 and is thoroughly mixed.

The following describes what would happen if the filler material 25 was not already of the proper size (approximately 0.5 to approximately 20 microns) to be used as filler 25 for the polymer used for battery anodes in this invention. In this example, coal chunks directly from a coal mine are used.

The coal chunks (roughly golf ball size) would be reduced in size as they passed through (in order) the crusher 26, grinder 28, and the Attritor 30, before going into the drying oven 32. The dried powder would be stored in the dry, inerted powder storage bin 34.

The appropriate amount of fine filler powder 200 from the powder storage bin 34 would be mixed with the catalyzed polymer from static mixer 24 in the mixer 36 and the coated powder or polymer slurry (depending on polymer content) would be deposited into trays to go through the Continuous Curing Oven 38.

Once cured the hard polymer would be removed from the trays (it won't stick due to mold release) and falls into a roller crusher 40, which reduces the chunks into powder prior to dumping the crushed powder into a temporary Powder Storage (load leveling) bin 42. The powder would then be removed from the bin and placed into trays on a belt that passes though the inert gas Pyrolysis Furnace 44 to be converted to ceramic. The furnace trays would then deposit the ceramic powder into a pre-crusher attached to a storage bin 46. The crushed powder would then be transferred to the Attritor 48, to be pulverized down to the 1-20 micron size needed for battery anodes. The fine powder from the attritor is checked for size by a powder size classification apparatus 50, attached to the attritor and the powder that was the proper size would go into storage for shipment 52. The dried powder would be stored in the dry, inert powder storage bin 34.

FIG. 14 is a flow chart of a process for making SiOC powder electrode material without a filler.

An economic decision will be made for scaled up production whether to make the battery anode PDC polymers via methods similar to those described herein (A) or to purchase the polymer from a specialty chemical toll producer (B). The rest of the process would be continuous or semi-continuous. In either case the polymer/resin 100 would be stored in resin storage 102 prior to use. The catalyst would be added to the polymer as the polymer enters the static mixer 104 and is thoroughly mixed prior to prior to being deposited into trays on a belt in the curing oven 106. Once cured the hard polymer would be removed from the trays; it won't stick due to mold release, and falls into a roller crusher 108, which reduces the chunks into powder prior to dumping the crushed powder into a temporary storage (load leveling) bin 110. The powder would then be removed from the bin and placed into trays on a belt that passes though the inert gas Pyrolysis Furnace 112, to be converted to ceramic.

The furnace trays would then deposit the ceramic powder into a pre-crusher attached to a storage bin 114. The crushed powder would then be transferred to the Attritor 116, to be pulverized down to the 1-20 micron size needed for battery anodes. The fine powder from the attritor 116 would check for size by a powder size classification apparatus 118 attached to the attritor 116 and the powder that was the proper size would go into storage 120 for shipment.

Figure 15A:
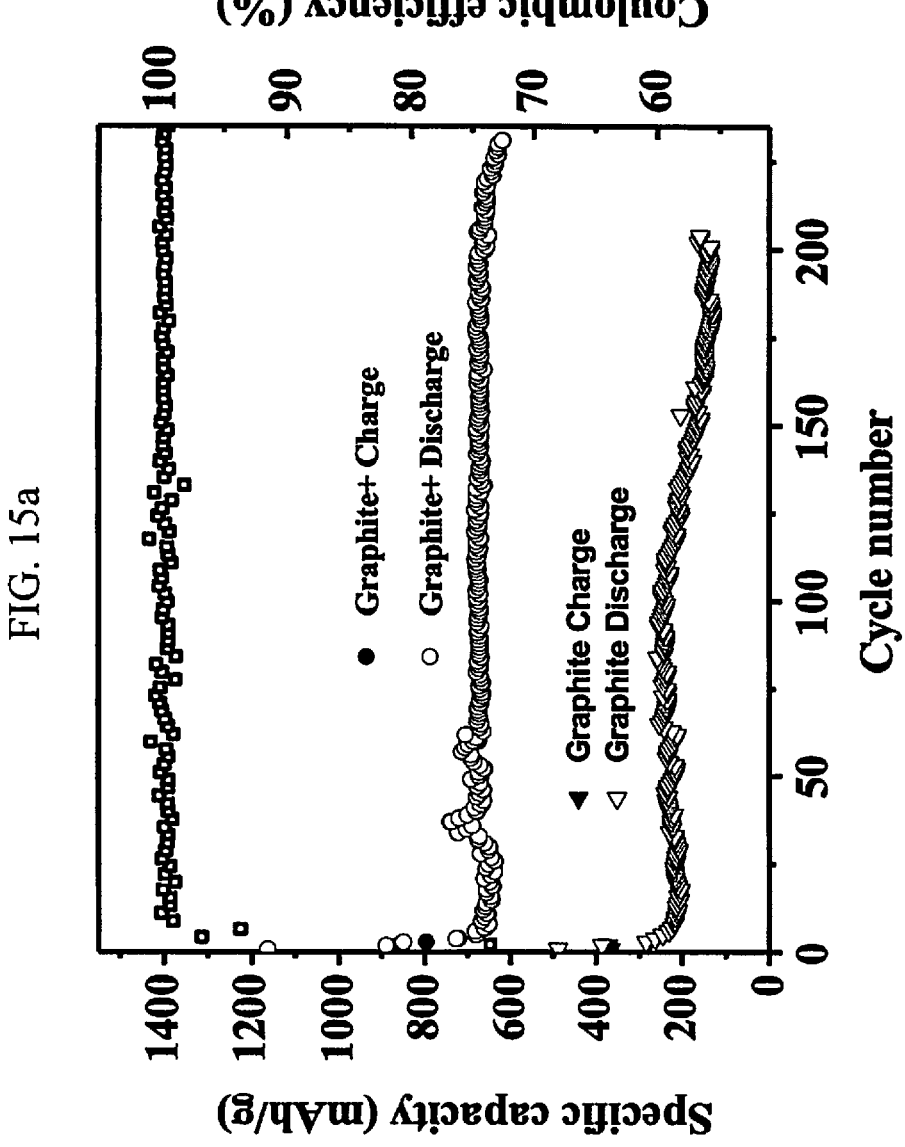
FIG. 15A is a graph of charge/discharge for a half-cell vs Li/Li$^+$ of specific capacity in a range from approximately 200 to approximately 1400 mAh/g verses cycle number with coulombic efficiency for an anode comprised of approximately 65% natural graphite and approximately 35% of a resin formulation in the thermoplastic category as found in Example 2. A reference half-cell vs Li/Li$^+$ contains approximately 100% natural graphite.

FIG. 15A is a graph of charge/discharge for a half-cell vs Li/Li$^+$ of specific capacity (mAh/g) verses cycle number with coulombic efficiency for an anode comprised of approximately 65% natural graphite and approximately 35% of a resin formulation in the thermoplastic category as found in Example 2. A reference half-cell vs Li/Li$^+$ contains approximately 100% natural graphite.

Active Material:PVDF:Conductive Carbon Additive 85:10:5

Activation Charge/Discharge rate @ approximately 37.2 mA/g

Cycling Charge/Discharge rate @ approximately 186 mA/g

Mass loading Graphite+ Electrode: approximately 1.59 mg/cm$^2$

Mass loading Graphite Electrode: approximately 3.55 mg/cm$^2$

Voltage Window: approximately 0.01 to approximately 3 V

FIG. 15B shows the discharge capacity of the battery in FIG. 15A after approximately 50 cycles, approximately 100 cycles, approximately 150 cycles and approximately 200 cycles wherein there is only a slight decrease in battery strength from approximately 673.7 mAh/g at approximately 50 cycles to approximately 662.9 mAh/g at approximately 200 cycles. While a battery with only graphite had a discharge capacity of approximately 217.4 mAh/g at approximately 50 cycles and only approximately 135.3 mAh/g at approximately 200 cycles. Thus, it is shown that the battery of the present invention is stronger and remains stronger with minimal loss of strength after many cycles.

Figure 16A:
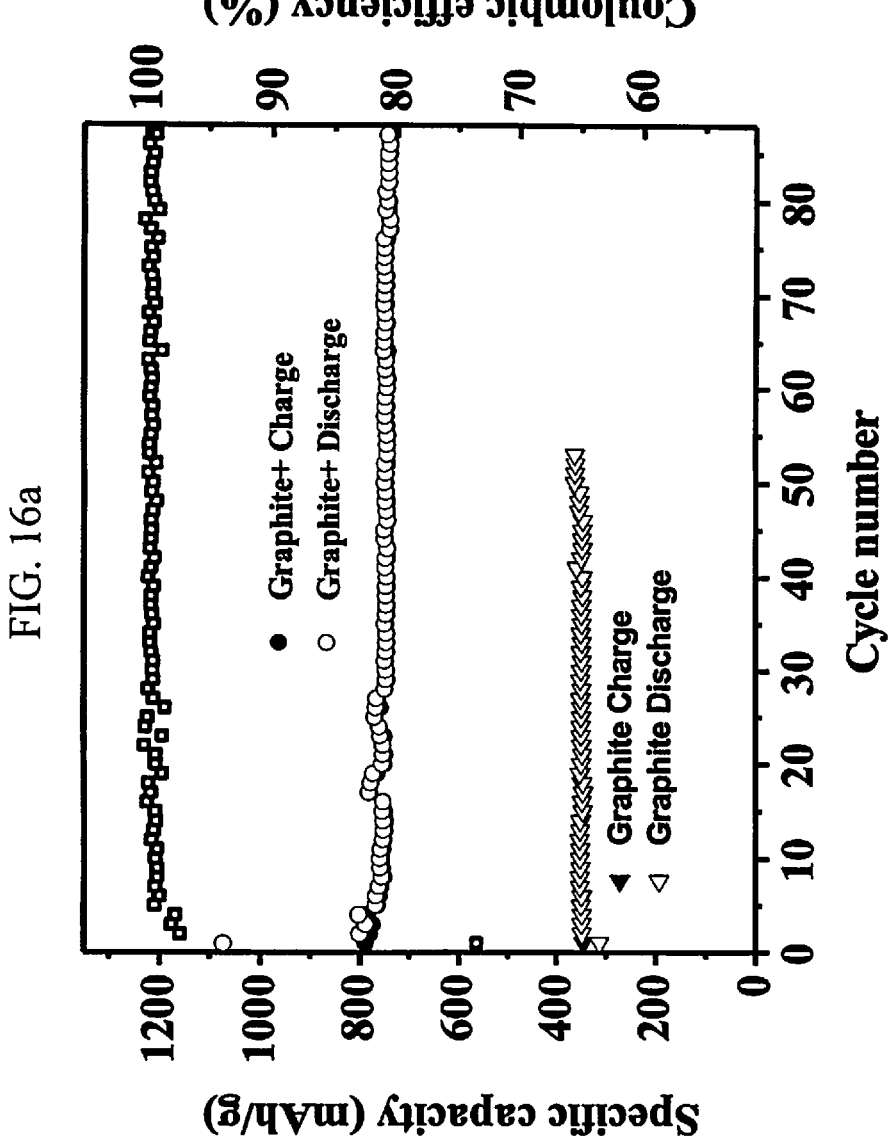
FIG. 16A is a graph of charge/discharge for a half-cell vs Li/Li$^+$ of specific capacity in a range from approximately 200 to approximately 1200 mAh/g verses cycle number with coulombic efficiency for a Graphite+ anode comprised of approximately 65% natural graphite and approximately 35% of a resin formulation in the thermoplastic category as found in Example 2. A reference half-cell vs Li/Li$^+$ contains approximately 100% natural graphite.

FIG. 16A is a graph of charge/discharge for a half-cell vs Li/Li$^+$ of specific capacity (mAh/g) verses cycle number with coulombic efficiency for a Graphite+ anode comprised of approximately 65% natural graphite and approximately 35% of a resin formulation in the thermoplastic category as found in Example 2. A reference half-cell vs Li/Li$^+$ contains approximately 100% natural graphite.

Active Material:PVDF:Conductive Carbon Additive 85:10:5

Charge/Discharge rate @ approximately 74.4 mA/g

Mass loading Graphite+ Electrode: approximately 2.47 mg/cm$^2$

Mass loading Graphite Electrode: approximately 2.17 mg/cm$^2$

Voltage Window: approximately 0.01 to approximately 3 V

FIG. 16B shows the discharge capacity of the battery in FIG. 16A after approximately 25 cycles, approximately 50 cycles, and approximately 75 cycles wherein there is only a slight decrease in battery strength from approximately 770.6 mAh/g at approximately 25 cycles to approximately 751.6 mAh/g at approximately 75 cycles. While a battery with only graphite had a discharge capacity of approximately 350.7 mAh/g at approximately 25 cycles and approximately 364.6 mAh/g at approximately 50 cycles. The increase in discharge capacity of the graphite only battery at approximately 50 cycles seems to be an aberration; however, it is noted that the discharge capacity is approximately check 50% of the discharge capacity of the battery of the present invention.

Figure 17A:
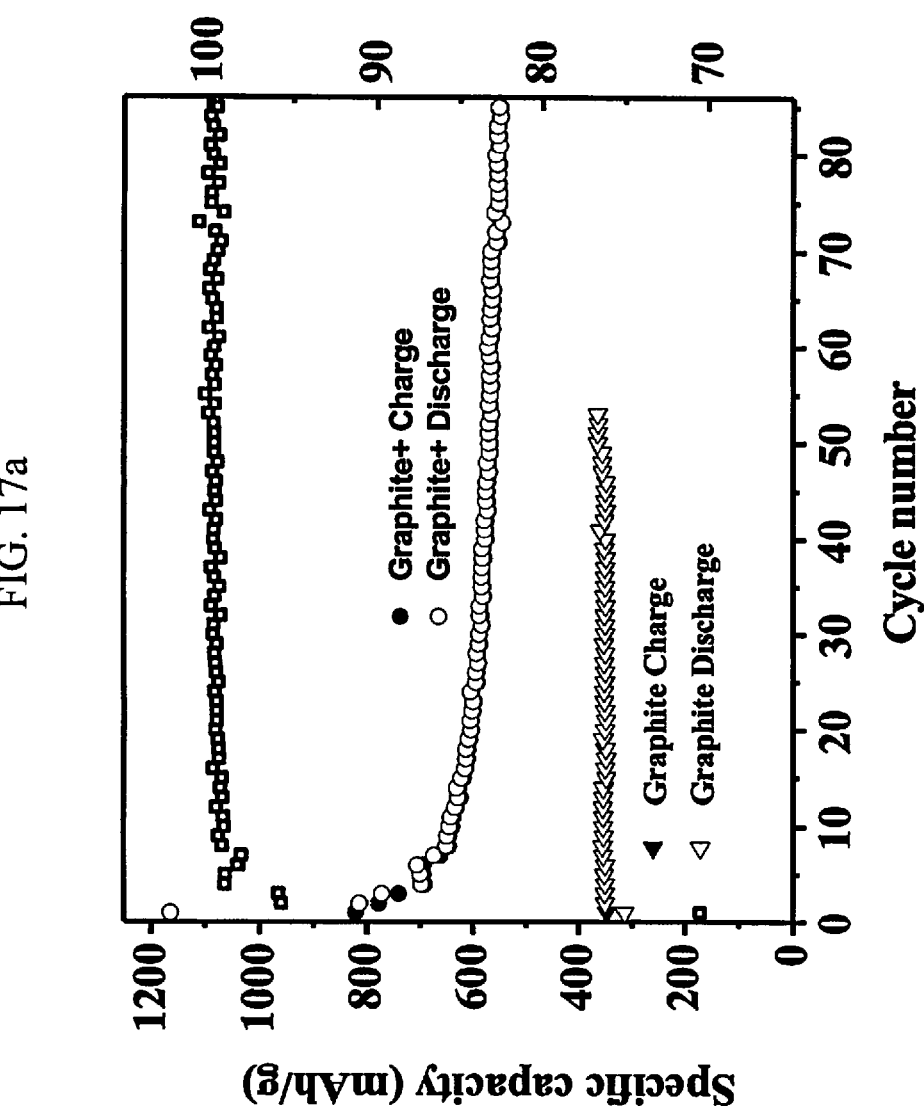
FIG. 17A is a graph of charge/discharge for a half-cell vs Li/Li$^+$ of specific capacity in a range from 200 to approximately 1200 mAh/g verses cycle number with coulombic efficiency for an anode comprised of approximately 65% natural graphite and approximately 35% of a resin formulation in the thermoplastic category as found in Example 2. A reference half-cell vs Li/Li$^+$ contains approximately 100% natural graphite.

FIG. 17A is a graph of charge/discharge for a half-cell vs Li/Li$^+$ of specific capacity (mAh/g) verses cycle number with coulombic efficiency for an anode comprised of approximately 65% natural graphite and approximately 35% of a resin formulation in the thermoplastic category as found in Example 2. A reference half-cell vs Li/Li$^+$ contains approximately 100% natural graphite.

Active Material:PVDF:Conductive Carbon Additive 85:10:5

Charge/Discharge rate @ approximately 74.4 mA/g

Mass loading Graphite+ Electrode: approximately 2.12 mg/cm$^2$

Mass loading Graphite Electrode: approximately 2.17 mg/cm$^2$

Voltage Window: approximately 0.01 to approximately 3 V

FIG. 17B shows the discharge capacity of the battery in FIG. 17A after approximately 25 cycles, approximately 50 cycles, and approximately 75 cycles wherein there is only a slight decrease in battery strength from approximately 595 mAh/g at approximately 25 cycles to approximately 570.4 mAh/g at approximately 50 cycles to approximately 552.3 mAh/g at approximately 75 cycles. While a battery with only graphite had a discharge capacity of approximately 350.7 mAh/g at approximately 25 cycles and approximately 364.6 mAh/g at approximately 50 cycles. The increase in discharge capacity of the graphite only battery at approximately 50 cycles seems to be an aberration; however, it is noted that the discharge capacity in this example is approximately from approximately 244.3 to approximately 205.8 mAh/g less than the discharge capacity of the battery of the present invention.

Figure 18:
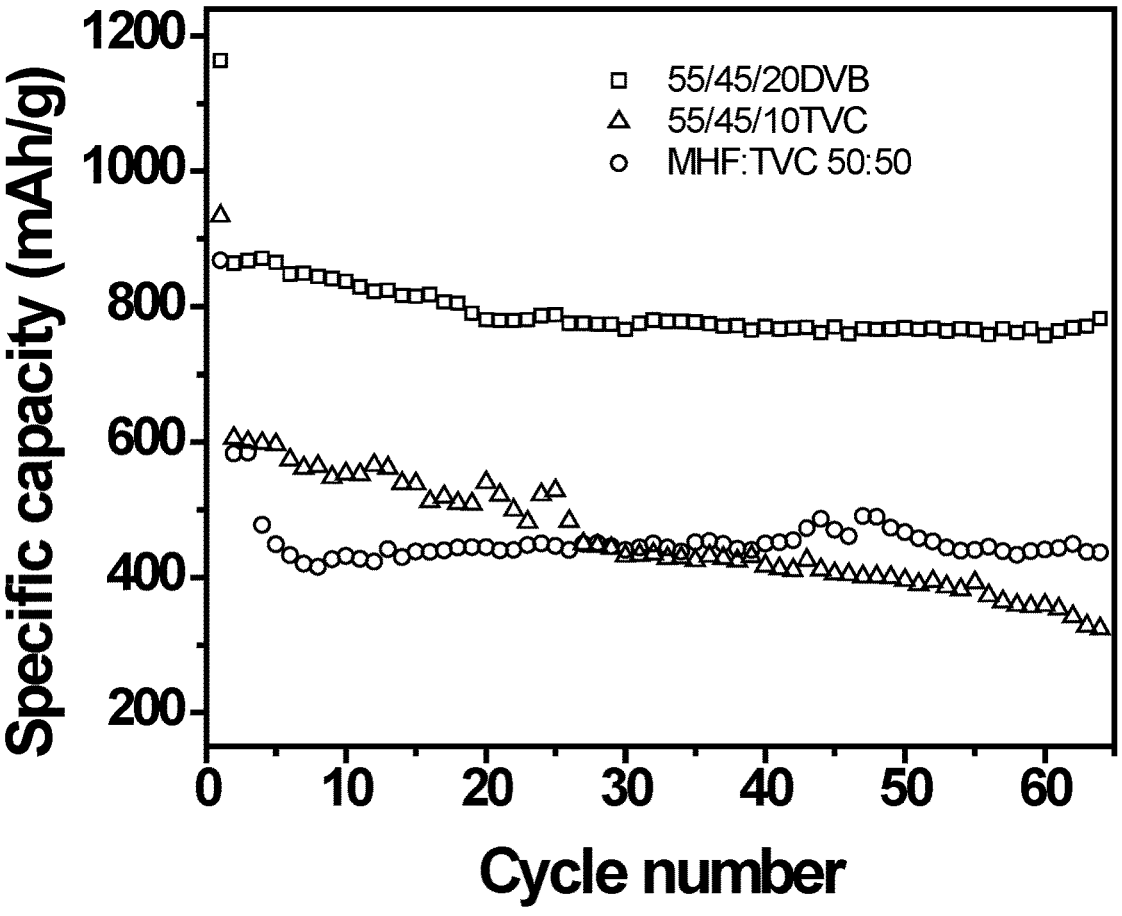
FIG. 18 shows that a ceramic battery anode material containing 20 per hundred resin (phr) divinylbenzene (DVB) outperforms ceramic materials without DVB in terms of specific capacity, cycle life, and cycle stability.

FIG. 18 compares capacity vs cycle life for the resin formulations MHF:TVC 50:50, 55/45/10TVC, and 55/45/20DVB anode materials in a half coin cell orientation (vs Li foil) and tested under similar conditions. The 55/45/20DVB anode material clearly outperforms the non-DVB anode materials by a significant margin.

The preparation and testing of each sample battery anode in FIG. 18 is disclosed in Example 4—MHF:TVC 50:50, Example 5—55/45/10TVC, and Example 6—55/45/20DVB.

EXAMPLE 4

MHF:TVC 50:50—without DVB

In one example, methyl hydrogen silicon fluid (MHF) was mixed with 1,3,5,7-Tetravinyl-1,3,5,7-Tetramethylcyclo-tetrasiloxane (TVC) in equal parts (resin denoted MHF:TVC 50:50). A platinum-based catalyst was added to the solution to promote proper reaction during pyrolysis in an oxygen free atmosphere, resulting in a ceramic material. After pyrolysis, the ceramic material is milled into a powder, formed into a usable electrode, then assembled into a half coin cell setup vs lithium foil to evaluate electrochemical performance. The performance in this example is significantly lower when compared to divinyl benzene containing thermosetting ceramic active materials in every category including first cycle efficiency (FCE) and specific capacity.

EXAMPLE 5

55/45/10TVC—without DVB

In one example, a base thermosetting resin denoted 55/45 was mixed with 10 per hundred resin (phr) TVC and mixed with a peroxide-based catalyst (resin denoted 55/45/10TVC). The solution was pyrolyzed in an oxygen free atmosphere, resulting in a ceramic material. After pyrolysis, the ceramic material is milled into a powder, formed into a usable electrode, then assembled into a half coin cell setup vs lithium foil to evaluate electrochemical performance. The performance in this example is significantly lower when compared to divinyl benzene containing thermosetting ceramic active materials in every category including first cycle efficiency (FCE) and specific capacity. The absence of DVB reduces the amount of free carbon that is beneficial to not only FCE and specific capacity, but in cycling stability and cycle life.

EXAMPLE 6

55/45/20DVB

In one example, a base thermosetting resin denoted 55/45 was interspersed with 20 per hundred resin (phr) Divinyl benzene (DVB) and mixed with a peroxide-based catalyst (resin denoted 55/45/10TVC). The solution was pyrolyzed in an oxygen free atmosphere, resulting in a ceramic material. After pyrolysis, the ceramic material is milled into a powder, formed into a usable electrode, then assembled into a half coin cell setup vs lithium foil to evaluate electrochemical performance. The performance in this example is significantly outperforms ceramic materials without DVB in terms of FCE, specific capacity, cycle life and cycle stability. The presence of DVB promotes free carbon formation during pyrolysis that is essential to creating high performance anode materials for lithium-ion batteries.

Actual values for each sample in FIG. 18 can be found in Table 9 below.

TABLE 9

Table showing effects of divinylbenzene (DVB) on Battery Behavior

| Resin ID | First Cycle Specific Capacity (mAh/g) | FCE (%) | 5th Cycle Specific Capacity (mAh/g) (C/5) | 10th Cycle Specific Capacity (mAh/g) (C/10) |
|---|---|---|---|---|
| 55/45/20DVB | Approx. 1164 | Approx. 74.11 | Approx. 865.4 | Approx. 837.8 |
| 55/45/10TVC | Approx. 934 | Approx. 63.33 | Approx. 597.8 | Approx. 547.4 |
| MHF:TVC 50:50 | Approx. 868.4 | Approx. 67.46 | Approx. 477.7 | Approx. 427.1 |

Table 9 and Examples 4, 5, and 6 support the discovery that divinylbenzene in a predetermined amount as a cross linking additive and a carbon content booster produces a higher carbon content that improves anode performance, by increasing the amount of free carbon that can participate in electrochemical reactions to improve storage capacity and stabilize cyclability, as well as increase conductivity of a powdered ceramic battery material in contrast to battery anode materials that do not include divinylbenzene (DVB).

Table 10 shows the effect of varying the amount of divinylbenzene in a battery anode composition. Within a range of from approximately 4% to approximately 50% divinylbenzene based on the total weight of the composition, there is a gradual increase in specific capacity and First Cycle Efficiency (FCE) of a battery anode.

TABLE 10

The Effects of Varying the Amount of Divinylbenzene (DVB) in a Battery Anode Comprising Silicon Oxycarbide, DVB modified Polymer Derived Ceramics (PDCs)

| Amount of DVB Based on Total Wt. of Composition | Specific Capacity mAh/g from Cycle 1 to 5 | First Cycle Efficiency (FCE) % |
|---|---|---|
| Approx. 4% | Approx. 1002 to Approx. 583 | Approx. 73.81 |
| Approx. 20% | Approx. 1164 to Approx. 865 | Approx. 74.11 |
| Approx. 50% | Approx. 1193 to Approx. 886 | Approx. 75.16 |

The amount of divinylbenzene to be used in the invention ranges from approximately 4% by mass to approximately 50% by mass, with the preferred amount of divinylbenzene approximately between 4% and 20%. Above 50% there is a significant loss of divinylbenzene by evaporation before it can be incorporated into the cured resin. Thus, the best and most economical results with the least amount of divinylbenzene based on the total weight of the PDC composition is when using approximately 20% DVB.

A typical battery electrode fabrication process using divinylbenzene as a crosslinker and carbon content booster is described in Example 1.

It has been discovered that a predetermined amount of vinyl or allyl-containing monomers or polymers, including, but not limited to, divinylbenzene, polybutadiene, 1,5-cyclooctadiene, norbornadiene, methylstyrene, tertiary-butylstyrene, are useful for both crosslinking and boosting the level of free carbon in a battery anode composition. The choice of vinyl or allyl-containing monomer or polymer will depend on cost considerations and efficiency in the production of free carbon. The preferred vinyl-containing monomer is divinylbenzene which provides low-cost production of high capacity, long cycle, long life battery anodes.

The terms "approximately", "Approx.", "about" and "near" can each be +/−10% of the amount referenced. Additionally, preferred amounts and ranges can include the amounts and ranges referenced without the prefix of being approximately.

Although specific advantages have been enumerated above, various embodiments may include some, none, or all of the enumerated advantages.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A polymer derived ceramic (PDC) composition incorporating silicon at a molecular level to produce a battery anode powder material that increases capacity and life cycle of a battery, wherein the PDC composition comprises:

a silicon hydride constituent at a molecular level, alkyl alkoxysilanes, a vinyl-containing organic crosslinking additive, and a catalyst, wherein the silicon hydride constituent at the molecular level is selected from the group consisting of a silicon hydride monomer, a silicon hydride polymer and mixtures thereof, the silicon hydride monomer is selected from the group consisting of phenylsilane, diphenylsilane, methylphenylsilane, and methylphenylvinylsilane, the silicon hydride polymer is selected from the group consisting of tetramethylcyclotetrasiloxane, methylhydrogen siloxane, and co-polymers of dimethylsiloxane/methylhydrogen siloxane, phenylmethylsiloxane/methylhydrogen siloxane, or diphenylsiloxane/methylhydrogen siloxane, wherein the silicon hydride constituent is reacted with the alkyl alkoxysilanes and the vinyl containing organic crosslinking additive, the vinyl containing organic crosslinking additive consists of divinylbenzene and a content of the divinylbenzene is between approximately 4% to approximately 20% by weight of the composition, wherein the composition produces the battery anode powder material which increases capacity of a battery and increases First Cycle Efficiency (FCE) of a battery anode between approximately 73.81% to approximately 75.16%.

2. A polymer derived ceramic (PDC) composition incorporating silicon at a molecular level to produce a battery anode powder material that increases capacity and life cycle of a battery, wherein the PDC composition comprises:

a silicon hydride constituent, a vinyl-containing organic crosslinking additive, and a catalyst, wherein the silicon hydride constituent is selected from the group consisting of a silicon hydride monomer, a silicon hydride polymer and mixtures thereof, the silicon hydride monomer is selected from the group consisting of phenylsilane, diphenylsilane, methylphenylsilane, and methylphenylvinylsilane, the silicon hydride polymer is selected from the group consisting of tetramethylcyclotetrasiloxane, methylhydrogen siloxane, and co-polymers of dimethylsiloxane/methylhydrogen siloxane, phenylmethylsiloxane/methylhydrogen siloxane, or diphenylsiloxane/methylhydrogen siloxane, wherein the silicon hydride constituent is reacted with the vinyl containing organic crosslinking additive, the vinyl containing organic crosslinking additive consists of divinylbenzene, wherein approximately 100 weight percent of the composition comprises:

approximately 35% to approximately 75% by weight of the silicon hydride monomer, silicon hydride polymer and mixtures thereof, approximately 4% to approximately 20% by weight of the divinylbenzene, approximately 0.1% to approximately 4% by weight of a catalyst, wherein the composition produces the battery anode powder material which increases capacity of a battery and increases First Cycle Efficiency (FCE) of a battery anode between approximately 73.81% to approximately 75.16%.

3. The polymer derived ceramic composition of claim 2, wherein the approximately 100 weight percent of the composition comprises:

approximately 40% to approximately 70% by weight of the silicon hydride monomer, silicon hydride polymer or mixtures thereof.

4. A polymer derived ceramic composition with a filler material incorporating silicon at a molecular level to produce a battery anode powder material that increases capacity of a battery and increases life cycle of a battery, wherein approximately 100 weight percent of the composition of the polymer with the filler material comprises:

approximately 10% to approximately 90% by weight of silicon hydride monomer, silicon hydride polymer or mixtures thereof, the silicon hydride monomer is selected from the group consisting of phenylsilane, diphenylsilane, methylphenylsilane, and methylphenylvinylsilane, the silicon hydride polymer is selected from the group consisting of tetramethylcyclotetrasiloxane, methylhydrogen siloxane, and co-polymers of dimethylsiloxane/methylhydrogen siloxane, phenylmethylsiloxane/methylhydrogen siloxane, or diphenylsiloxane/methylhydrogen siloxane, approximately 10% to approximately 90% by weight of a graphite carbon material selected from the group consisting of synthetic graphite, natural graphite, purified graphite, bituminous coal, anthracite coal, sub-bituminous coal, lignite, peat and mixtures thereof, up to approximately 20% by weight of carbon nanotubes, graphite nanofibers, milled graphite fibers, carbon black or graphene materials;

up to approximately 20% by weight of a filler selected from the group consisting of silicon micropowder or silicon nanopowder, titanium or titanium-based nanopowder, zirconium or zirconium based nanopowder, tin or tin-based nanopowder, copper or copper-based nanopowder, aluminum or aluminum based nanopowder, and lithium or lithium-based compound, and approximately 4% to approximately 20% of a crosslinking additive that consists of divinylbenzene, wherein the composition increases capacity of a battery and increases First Cycle Efficiency (FCE) of a battery anode between approximately 73.81% to approximately 75.16%.

5. A polymer derived ceramic (PDC) composition incorporating silicon at a molecular level to produce a battery anode powder material that increases the capacity of a battery and increases life cycle of a battery, wherein the PDC composition comprises:

a silicon hydride constituent, a vinyl-containing organic modifier and a catalyst, wherein the silicon hydride constituent is selected from the groups consisting of a silicon hydride monomer, a silicon hydride polymer and mixtures thereof, the silicon hydride monomer is selected from the group consisting of phenylsilane, diphenylsilane, methylphenylsilane, and methylphenylvinylsilane, the silicon hydride polymer is selected from the group consisting of tetramethyleyclotetrasiloxane, methylhydrogen siloxane, and co-polymers of dimethylsiloxane/methylhydrogen siloxane, phenylmethylsiloxane/methylhydrogen siloxane, or diphenylsiloxane/methylhydrogen siloxane, wherein the silicon hydride constituent is reacted with the vinyl-containing organic modifier, wherein the vinyl-containing organic modifier consists of divinylbenzene and is between approximately 4% to approximately 20% by weight of the composition, wherein the composition increases capacity of a battery and increases First Cycle Efficiency (FCE) of a battery anode between approximately 73.81% to approximately 75.16%.

6. A polymer derived ceramic (PDC) composition incorporating silicon at a molecular level to produce a battery anode material that increases capacity of a battery and increases life cycle of a battery, wherein the PDC composition comprises:

a silicon hydride constituent, a vinyl-containing organic modifier, and a catalyst, wherein the silicon hydride constituent is selected from the group consisting of a silicon hydride monomer, a silicon hydride polymer and mixtures thereof, the silicon hydride monomer is selected from the group consisting of phenylsilane, diphenylsilane, methylphenylsilane, and methylphenylvinylsilane, the silicon hydride polymer is selected from the group consisting of tetramethylcyclotetrasiloxane, methylhydrogen siloxane, and co-polymers of dimethylsiloxane/methylhydrogen siloxane, phenylmethylsiloxane/methylhydrogen siloxane, or diphenylsiloxane/methylhydrogen siloxane, wherein the silicon hydride constituent is reacted with vinyl-containing organic modifier, wherein the vinyl-containing organic modifier consists of divinylbenzene and is between approximately 4% to approximately 20% by weight of the composition, wherein the composition increases capacity of a battery and increases First Cycle Efficiency (FCE) of a battery anode between approximately 73.81% to approximately 75.16%.

7. A polymer derived ceramic composition with a filler material incorporating silicon at a molecular level to produce a battery anode powder material that increases capacity of a battery and increases life cycle of a battery, wherein approximately 100 weight percent of the composition comprises:

approximately 10% to approximately 90% by weight of silicon hydride monomer, silicon hydride polymer or mixtures thereof, the silicon hydride monomer is selected from the group consisting of phenylsilane, diphenylsilane, methylphenylsilane, and methylphenylvinylsilane, the silicon hydride polymer is selected from the group consisting of tetramethylcyclotetrasiloxane, methylhydrogen siloxane, and co-polymers of dimethylsiloxane/methylhydrogen siloxane, phenylmethylsiloxane/methylhydrogen siloxane, or diphenylsiloxane/methylhydrogen siloxane, approximately 10% to approximately 90% by weight of a graphite carbon material selected from the group consisting of synthetic graphite, natural graphite, purified graphite, bituminous coal, anthracite coal, sub-bituminous coal, lignite, peat and mixtures thereof, up to approximately 20% by weight of carbon nanotubes, graphite nanofibers, milled graphite fibers, carbon black or graphene materials, up to approximately 20% by weight of the filler selected from the group consisting of silicon micropowder or silicon nanopowder, titanium or titanium-based nanopowder, zirconium or zirconium based nanopowder, tin or tin-based nanopowder; copper or copper-based nanopowder, aluminum or aluminum based nanopowder, and lithium or lithium-based compound, and approximately 4% to approximately 20% by weight of a crosslinking additive consists of divinylbenzene, wherein the composition increases capacity of a battery and increases First Cycle Efficiency (FCE) of a battery anode between approximately 73.81% to approximately 75.16%.

8. A battery anode composition comprising:

a polymer derived ceramic (PDC) composition incorporating silicon at a molecular level, the polymer derived ceramic (PDC) composition comprises a silicon hydride constituent, vinyl-containing organic modifier, and a catalyst, wherein the silicon hydride constituent is selected from group consisting of a silicon hydride monomer, a silicon hydride polymer and mixtures thereof, the silicon hydride monomer is selected from the group consisting of phenylsilane, diphenylsilane, methylphenylsilane, and methylphenylvinylsilane, the silicon hydride polymer is selected from the group consisting of tetramethylcyclotetrasiloxane, methylhydrogen siloxane, and co-polymers of dimethylsiloxane/methylhydrogen siloxane, phenylmethylsiloxane/methylhydrogen siloxane, or diphenylsiloxane/methylhydrogen siloxane, wherein the silicon hydride constituent is reacted with the vinyl-containing organic modifier, the vinyl-containing modifier consists of divinylbenzene and is between approximately 4% to approximately 20% by weight of the composition, and wherein the composition increases capacity of a battery and increases First Cycle Efficiency (FCE) of a battery anode between approximately 73.81% to approximately 75.16%.

9. The battery anode composition of claim 8, wherein the catalyst is selected from the group consisting of platinum-containing compounds, peroxide-containing compounds, or organometallic compounds.

* * * * *